(12) United States Patent
Lithoxoos et al.

(10) Patent No.: US 11,572,274 B2
(45) Date of Patent: Feb. 7, 2023

(54) ADSORPTION-BASED CLAUS TAIL GAS TREATMENT THROUGH REGENERATION TEMPERATURE RAMPING

(71) Applicant: Saudi Arabian Oil Company, Dhahran (SA)

(72) Inventors: Georgios Lithoxoos, Dhahran (SA); Rashid M. Othman, Dhahran (SA); Ismail A. Alami, Dhahran (SA); Sebastien A. Duval, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 193 days.

(21) Appl. No.: 17/166,821

(22) Filed: Feb. 3, 2021

(65) Prior Publication Data
US 2022/0242729 A1    Aug. 4, 2022

(51) Int. Cl.
*C01B 17/16*    (2006.01)
*B01J 19/24*    (2006.01)
*B01D 53/04*    (2006.01)

(52) U.S. Cl.
CPC ........ *C01B 17/167* (2013.01); *B01D 53/0423* (2013.01); *B01D 53/0438* (2013.01); *B01J 19/24* (2013.01); *C01B 17/168* (2013.01); *B01D 2253/108* (2013.01); *B01D 2253/116* (2013.01); *B01D 2257/304* (2013.01); *B01D 2257/80* (2013.01); *B01D 2259/4009* (2013.01); *B01D 2259/4062* (2013.01); *B01D 2259/414* (2013.01)

(58) Field of Classification Search
CPC ............ B01D 53/0423; B01D 53/0438; B01D 2259/414; B01D 2257/80; B01D 2253/108; B01D 2253/116; B01D 2259/4009; B01D 2259/4062; B01D 2257/304; B01J 19/24; C01B 17/167; C01B 17/168
See application file for complete search history.

(56) References Cited

U.S. PATENT DOCUMENTS

| | | |
|---|---|---|
| 3,752,877 A | 3/1973 | Beavon |
| 4,001,386 A | 1/1977 | Klein et al. |
| 4,178,358 A | 12/1979 | Smith et al. |
| 5,023,069 A | 6/1991 | Serrand |
| 6,402,813 B2 | 6/2002 | Monereau et al. |
| 8,361,200 B2 | 1/2013 | Sayaryi et al. |
| 8,524,184 B2 | 9/2013 | Iyengar et al. |
| 8,551,199 B2 | 10/2013 | Thacker et al. |
| 9,149,761 B2 | 10/2015 | Northrop et al. |
| 9,731,974 B2 | 8/2017 | Weiss et al. |
| 10,188,988 B2 | 1/2019 | Debrock et al. |
| 10,662,061 B1 | 5/2020 | Lithoxoos et al. |
| 2011/0185896 A1 | 8/2011 | Sethna et al. |
| 2011/0268650 A1* | 11/2011 | Lamar ................. C01B 17/0456 422/612 |
| 2017/0190574 A1 | 7/2017 | Ercan et al. |

FOREIGN PATENT DOCUMENTS

| | | | |
|---|---|---|---|
| EP | 1 142 628 A2 * | 10/2001 | ............. B01D 53/52 |
| IN | 2015 003 855 I1 * | 1/2018 | |

OTHER PUBLICATIONS

PCT Application No. PCT/IB2019/061417, Lithoxoos et al., Regeneration Schemes for a Two Stage Adsorption Process for Claus Tail Gas Treatment, filed Dec. 28, 2019, 75 pages.

\* cited by examiner

*Primary Examiner* — Timothy C Vanoy
(74) *Attorney, Agent, or Firm* — Fish & Richardson P.C.

(57) ABSTRACT

A system and method for sulfur recovery, including hydrogenating Claus tail gas, quenching the hydrogenated gas, adsorbing water and hydrogen sulfide from the quenched gas, and regenerating adsorbent with carbon dioxide and/or nitrogen and heating the adsorbent in a regeneration temperature ramp to desorb primarily hydrogen sulfide in a first part of the temperature ramp.

22 Claims, 10 Drawing Sheets

ADSORPTION-BASED CLAUS TAIL GAS TREATMENT THROUGH REGENERATION TEMPERATURE RAMPING

TECHNICAL FIELD

This disclosure relates to sulfur recovery including hydrogen sulfide recovery from Claus tail gas.

BACKGROUND

Sulfur recovery may refer to conversion of hydrogen sulfide to elemental sulfur. Hydrogen sulfide can be a byproduct of processing natural gas and refining sulfur-containing crude oils. The conventional method of sulfur recovery is the Claus process. A conventional Claus process can recover between 95% and 98% of hydrogen sulfide. The tail gas from the Claus process may have the remaining (residual) hydrogen sulfide, such as less than 5% of the hydrogen sulfide. The Claus tail gas can be treated to recover this remaining hydrogen sulfide.

Thus, the conventional Claus process is the upstream process that recovers the bulk of the hydrogen sulfide, and includes a thermal combustion stage and a catalytic reaction stage. In terms of equipment, the Claus unit (or Claus plant) includes a thermal reactor and two or three catalytic reactors (or Claus converters). Typical sulfur recovery efficiency for Claus units with two Claus converters is between 90% and 97%, and for a Claus unit with three Claus converters is between 95% and 98%. But there is increasing demand to achieve higher sulfur removal and recovery efficiency due to tight emissions regulations. Recent environmental regulations regarding sulfur oxides ($SO_x$) emissions place a stringent requirement on commercial sulfur recovery and accordingly, most countries require sulfur recovery efficiency in the range of 98.5% to 99.9%, or higher.

The addition of a tail gas treatment unit (TGTU) can increase sulfur recovery to or above 99.9%, but can employ complex and expensive equipment. The TGTU entails either an add-on unit at the end of the Claus unit or a modification to the Claus unit itself. The add-on TGTU at the end of the Claus unit is generally used when the Claus process includes two Claus converters. Although there are several varieties of tail gas treatment technologies, they can be grouped within the following four broad categories: sub-dew point Claus process, direct oxidation of hydrogen sulfide to sulfur, sulfur dioxide reduction and recovery of hydrogen sulfide, and hydrogen sulfide combustion to sulfur dioxide and recovery of sulfur dioxide.

Sub-dew point Claus processes are based on a Claus converter performing at temperatures lesser than the sulfur dew point (lesser temperature may be desirable due to equilibrium nature of the Claus catalytic reaction). Processes involving direct oxidation of hydrogen sulfide to sulfur are based on selective oxidation of hydrogen sulfide by oxygen to elemental sulfur using selective catalysts. TGTU technology based on sulfur dioxide reduction and recovery of hydrogen sulfide involves the catalytic hydrogenation of leftover sulfur species to hydrogen sulfide, absorption of the hydrogen sulfide with amine solution and then recycling the hydrogen sulfide back to the Claus furnace. TGTU technology based on hydrogen sulfide combustion to sulfur dioxide and recovery of sulfur dioxide involves the combustion of leftover hydrogen sulfide in the tail gas stream to sulfur dioxide, absorption of sulfur dioxide with a solvent (wet scrubbing), and recycling the sulfur dioxide back to the feed to Claus unit. Although sulfur dioxide scrubbing, also known as flue gas scrubbing, has not been commercially tested as a TGTU, the technology has been extensively used as flue gas scrubbing for coal based power stations.

SUMMARY

An aspect relates to a method for sulfur recovery, involving hydrogenating Claus tail gas to produce hydrogenated gas including hydrogen sulfide, water, and at least of one of carbon dioxide or nitrogen, and processing the hydrogenated gas in a quench tower to produce quenched gas including hydrogen sulfide, water, and at least one of carbon dioxide or nitrogen. The method includes feeding the quenched gas to an adsorbing first-stage adsorption vessel, and adsorbing water from the quenched gas onto first adsorbent in the adsorbing first-stage adsorption vessel to produce a first outlet gas. The first outlet gas includes hydrogen sulfide and at least one of carbon dioxide or nitrogen. The method includes feeding the first outlet gas to an adsorbing second-stage adsorption vessel, and adsorbing hydrogen sulfide from the first outlet gas onto second adsorbent in the adsorbing second-stage adsorption vessel to produce a second byproduct stream comprising at least one of carbon dioxide or nitrogen. The method includes feeding a first portion of the second byproduct stream as regeneration gas to a regenerating first-stage adsorption vessel, and heating the regenerating first-stage adsorption vessel in a temperature ramp to selectively desorb components from first adsorbent in the regenerating first-stage adsorption vessel to produce a first byproduct stream including desorbed components. The components desorbed during a first part of the temperature ramp include primarily hydrogen sulfide.

Another aspect relates to a system for treating Claus tail gas, including a hydrogenation reactor to receive the Claus tail gas and hydrogenate sulfur-containing compounds in the Claus tail gas into hydrogen sulfide to produce hydrogenated gas including hydrogen sulfide, water, and at least one of carbon dioxide or water. The system includes a quench tower to receive the hydrogenated gas and condense water in the hydrogenated gas to produce quenched gas comprising hydrogen sulfide, water, and at least of one of carbon dioxide or nitrogen, wherein condensed water is recovered as water condensate from the quench tower. The system includes a first first-stage adsorption vessel to receive in an adsorption cycle the quenched gas and adsorb water from the quenched gas onto first adsorbent to produce a first outlet gas including hydrogen sulfide and at least one of carbon dioxide or nitrogen. The system includes a first second-stage adsorption vessel to receive in an adsorption cycle the first outlet gas and adsorb hydrogen sulfide from the first outlet gas onto second adsorbent to produce a second byproduct stream comprising at least one of carbon dioxide or nitrogen. The system includes a second first-stage adsorption vessel to receive in a regeneration cycle a first portion of the second byproduct stream as regeneration gas and heat first adsorbent in second first-stage adsorption vessel per a temperature ramp to selectively desorb components from the first adsorbent in the second first-stage adsorption vessel to produce a first byproduct stream including desorbed components and at least one of carbon dioxide or nitrogen, wherein the components desorbed during a first part of the temperature ramp include primarily hydrogen sulfide.

The details of one or more implementations are set forth in the accompanying drawings and the description below.

Other features and advantages will be apparent from the description and drawings, and from the claims.

DETAILED DESCRIPTION

Figure 1:
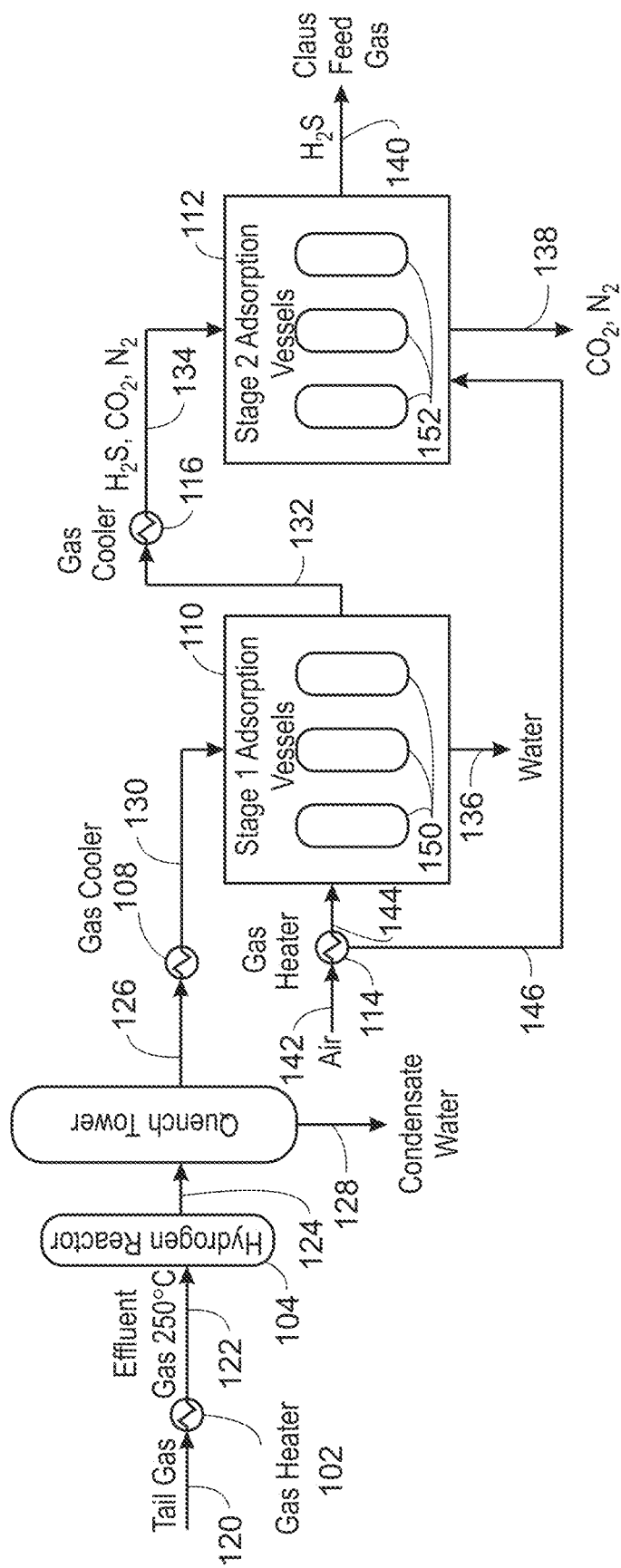
FIG. 1 is a diagram of a process for a Claus tail gas treatment system.

Some aspects of the present disclosure are directed to regeneration techniques in two-stage adsorption for Claus tail gas treatment. The technique may include applying a controlled temperature increase during adsorbent regeneration. During the initial part of the temperature ramp, primarily hydrogen sulfide ($H_2S$) may desorb from the adsorbent. The regeneration gas during this first part of the temperature ramp with desorbed hydrogen sulfide may be sent to the reaction furnace of the upstream Claus unit that generated the Claus tail gas. Therefore, hydrogen sulfide may be beneficially recovered in the tail gas treatment to the reaction furnace. During the second part of the temperature ramp, water may desorb or the concentration of desorbed hydrogen sulfide in the regeneration gas may drop below a threshold. The regeneration gas during this second part of the temperature ramp with any water may be sent, for example, to the quench tower in the tail gas treatment instead of to the reaction furnace. The clean regeneration gas introduced for regenerating the adsorbent may be primarily carbon dioxide ($CO_2$) and nitrogen ($N_2$). Therefore, routing the spent regeneration gas to the quench tower during the second part of the temperature ramp beneficially reduces introduction of inert gas to the upstream Claus sulfur recovery. Capacity and efficiency of the Claus reaction furnace can be adversely impacted by presence of inert gas.

Some aspects of the present disclosure are directed to a Claus tail gas treatment system that can increase overall sulfur recovery (in combination with the Claus unit) to at least about 99.90%, at least about 99.93%, or at least about 99.95%. In some embodiments, the Claus tail gas treatment system is an add-on unit positioned at the end of the Claus unit configured to receive the tail gas from the Claus unit. In other embodiments, the Claus tail gas treatment system is an independent unit configured to receive the tail gas from the Claus unit. Still in other embodiments, the Claus tail gas treatment system can be positioned between two Claus converters within the Claus unit.

Embodiments are directed to techniques for a regeneration scheme of adsorption vessels in the Claus tail gas treatment system. The techniques may involve temperature ramping in the regeneration of adsorption vessels, such as heating the adsorption vessels progressively, for example, from ambient temperature up to about 300° C. As the temperature increases gradually, hydrogen sulfide may generally be continuously desorbed while the water generally remains adsorbed in the vessel. The discharged regeneration gas stream (e.g., primarily carbon dioxide and nitrogen) concentrated in hydrogen sulfide as compared to water is directed to the feed gas for the upstream Claus reaction furnace. When the temperature of the regenerating adsorption vessel reaches the level where water starts to breakthrough (desorb from the adsorbent into the regeneration gas) and/or the regeneration time results in hydrogen sulfide concentration lower than a certain value in the regeneration gas, the discharged regeneration gas stream may be redirected to the quench tower to avoid injection of inert gas to the Claus unit. The polishing removal of hydrogen sulfide and water may be performed while circulating the regeneration gas to the quench tower.

FIG. 1 shows a schematic diagram of process 100 for an embodiment of the Claus tail gas treatment system. For additional discussion of a Claus tail gas treatment system, see U.S. Pat. No. 10,662,061 which is incorporated by reference herein in its entirety. Process 100 can include first heat exchanger 102, hydrogenation reactor 104, quench tower 106, second heat exchanger 108, first-stage adsorption unit 110, second-stage adsorption unit 112, third heat exchanger 114, and fourth heat exchanger 116.

Tail gas stream 120 is heated via first heat exchanger 102 to produce a tail gas stream 120. Tail gas stream 122 is introduced to hydrogenation reactor 104 to produce hydrogenated gas stream 124. Hydrogenated gas stream 124 is introduced to quench tower 106 to produce quenched gas stream 126 and water condensate stream 128. Quenched gas stream 126 is cooled via the second heat exchanger 108 to produce quenched gas stream 130. Quenched gas stream 130 is introduced to first-stage adsorption unit 110 to produce first outlet gas stream 132 and first byproduct stream 136. First outlet gas stream 132 is cooled via fourth heat exchanger 116 to produce first outlet gas stream 134. First outlet gas stream 134 is introduced to second-stage adsorption unit 112 to produce second outlet gas stream 140 and second byproduct stream 138.

Optionally, air feed 142 can be heated via third heat exchanger 114 to produce first regeneration gas stream 144 and second regeneration gas stream 146. First regeneration gas stream 144 is introduced to first-stage adsorption unit 110. Second regeneration gas stream 146 is introduced to second-stage adsorption unit 112. As discussed below, relatively clean gas including carbon dioxide and nitrogen may be utilized as the regeneration gas instead of air.

Tail gas stream 120 includes a Claus tail gas. The Claus tail gas includes sulfur-containing compounds that were not fully recovered by the Claus unit. The sulfur-containing compounds can exist in forms such as elemental sulfur, hydrogen sulfide, sulfur oxides, and anionic counterparts of the same. As used herein, the term "elemental sulfur" refers to all phases of sulfur, which can exist in the forms such as $S$, $S_2$, $S_3$, $S_4$, $S_5$, $S_6$, $S_7$, and $S_8$. Non-limiting example sulfur oxides include $SO$, $SO_2$, $SO_3$, $SO_4$, $S_2O$, $S_2O_2$, $S_6O$, $S_6O_2$, $S_7O$, $S_7O_2$, $S_8O$, $S_9O$, and $S_{10}O$. The Claus tail gas can also include carbon dioxide, water, nitrogen, hydrogen, and combinations of the same.

First heat exchanger 102 can be any heat exchanger capable of heating a gas stream to a temperature at which hydrogenation reactions can occur in hydrogenation reactor 104. First heat exchanger 102 can heat tail gas stream 120 such that tail gas stream 122 has a temperature between about 200° C. and about 300° C., alternately between about 220° C. and about 280° C., and alternately between about 240° C. and about 260° C. In at least one embodiment, the temperature of tail gas stream 122 is about 250° C. Tail gas stream 122 can include the sulfur-containing compounds, carbon dioxide, water, nitrogen, hydrogen, and combinations of the same.

Hydrogenation reactor 102 can be any reactor, catalytic or non-catalytic, capable of reducing the sulfur-containing compounds other than hydrogen sulfide to hydrogen sulfide. Optionally, hydrogen included in tail gas stream 122 can be used for reducing the sulfur-containing compounds to hydrogen sulfide. Optionally, a make-up hydrogen gas stream (not shown) can be introduced to hydrogenation reactor 102. Optionally, water can be produced as a byproduct during the hydrogenation reaction. As a result, hydrogenated gas stream 124 includes sulfur-containing compounds of substantially hydrogen sulfide only. Hydrogenated gas stream 124 can also include carbon dioxide, water, nitrogen, and combinations of the same.

Quench tower 106 can be any apparatus capable of condensing and recovering water. A significant portion of water included in hydrogenated gas stream 124 is condensed and substantially recovered via water condensate stream 128. Although a significant portion of water included in hydrogenated gas stream 124 is removed, the resulting quenched gas stream 126 can still include residual amounts of gas phase water. Quenched gas stream 126 has a gas phase water content ranging between about 0 mol % and about 20 mol %, alternately between about 3 mol % and about 15 mol %, or alternately between about 4 mol % and about 10 mol %. In at least one embodiment, the gas phase water content of quenched gas stream 126 is about 8 mol %. Quenched gas stream 126 can also include hydrogen sulfide (that is, the hydrogen sulfide preexisting in the Claus tail gas or produced in hydrogenation reactor 102, or both), carbon dioxide, nitrogen, and combinations of the same. Quenched gas stream 126 has a temperature ranging between about 20° C. and about 170° C., alternately between about 30° C. and about 100° C., or alternately between about 40° C. and about 80° C. In at least one embodiment, the temperature of quenched gas stream 126 is about 43° C.

Second heat exchanger 108 can be any heat exchanger capable of cooling a gas stream to a temperature at which adsorption occurs in first-stage adsorption unit 110. Second heat exchanger 108 can cool quenched gas stream 126 such that quenched gas stream 130 has a temperature ranging between about 0° C. and about 70° C., alternately between about 10° C. and about 40° C., and alternately between about 15° C. and about 30° C. In at least one embodiment, the temperature of quenched gas stream 130 is about 21° C. As quenched gas stream 126 is cooled, the gas phase water content of quenched gas stream 130 reduces to a range between about 0 mol % and about 10 mol %, alternately between about 0 mol % and about 5 mol %, or alternately between about 0 mol % and about 1 mol %. In at least one embodiment, the gas phase water content of quenched gas stream 130 is about 0.46 mol %. Quenched gas stream 130 can include hydrogen sulfide (that is, the hydrogen sulfide preexisting in the Claus tail gas or produced in hydrogenation reactor 102, or both), carbon dioxide, water, nitrogen, and combinations of the same.

First-stage adsorption unit 110 includes one or more first-stage adsorption vessels 150 fluidly connected in series or parallel. Each of the one or more first-stage adsorption vessels 150 is filled with a first adsorbent. The first adsorbent can include any adsorbent capable of selectively capturing hydrogen sulfide while generally rejecting water from a wet gas stream (such as the quenched gas stream 130). Non-limiting example materials used for the first adsorbent include all-silica zeolites having a framework such as an MFI type or a CHA type. The all-silica zeolites are hydrophobic materials that can be used to separate polar molecules such as water from lesser polar molecules such as hydrogen sulfide, carbon dioxide, and nitrogen. During an adsorption cycle, components of quenched gas stream 130 are introduced through one or more first-stage adsorption vessels 150 of first-stage adsorption unit 110. Components other than water (that is, hydrogen sulfide) are captured in the pores of the first adsorbent. Water passes through the first adsorbent and is subsequently collected via first byproduct stream 136. During a regeneration cycle, components of first regeneration gas stream 144 enter one or more first-stage adsorption vessels 150 to regenerate the first adsorbent. Desorption occurs in the one or more first-stage adsorption vessels 150, where the first adsorbent releases the captured hydrogen sulfide to produce first outlet gas stream 132 substantially in the absence of water.

In other embodiments, the first adsorbent can include any adsorbent capable of selectively capturing water form a wet gas stream (such as quenched gas stream 130) while generally rejecting hydrogen sulfide. Non-limiting example materials used for the first adsorbent include molecular sieves, such as hydrophilic 3A molecular sieves shown for example in U.S. Pat. No. 9,701,537, which is incorporated in this disclosure by reference in its entirety. During an adsorption cycle, components of quenched gas stream 130 are introduced through one or more first-stage adsorption vessels 150 of first-stage adsorption unit 110. Water (and relatively small amount of hydrogen sulfide) is captured in the pores of the first adsorbent. Components other than water (that is, hydrogen sulfide, carbon dioxide, and nitrogen) pass through the first adsorbent to produce first outlet gas stream 132 substantially in the absence of water. During a regeneration cycle, components of first regeneration gas stream 144 enter one or more first-stage adsorption vessels 150 to regenerate the first adsorbent. Desorption occurs in one or more first-stage adsorption vessels 150, where the first adsorbent releases the captured water (and relatively small amount of hydrogen sulfide) which can be collected via first byproduct stream 136.

In some embodiments, first-stage adsorption unit 110 includes at least three first-stage adsorption vessels 150 fluidly connected in a parallel manner. At any given moment during operation, one of the at least three first-stage adsorption vessels 150 is conducting the adsorption cycle, one of the at least three first-stage adsorption vessels 150 is conducting the regeneration cycle, and one of the at least three first-stage adsorption vessels 150 is standing by. In this manner, components of quenched gas stream 130 can be continuously fed to first-stage adsorption unit 110 and a continuous flow of first outlet gas stream 132 can be produced from first-stage adsorption unit 110.

Fourth heat exchanger 116 can be any heat exchanger capable of cooling a gas stream to a temperature at which adsorption occurs in second-stage adsorption unit 112. Fourth heat exchanger 116 can cool first outlet gas stream 132 such that first outlet gas stream 134 has a temperature between about 0° C. and about 70° C., alternately between about 10° C. and about 40° C., and alternately between about 15° C. and about 30° C. In at least one embodiment, the temperature of first outlet gas stream 134 is about 25° C. First outlet gas stream 134 can include hydrogen sulfide, carbon dioxide, nitrogen, and combinations of the same, all of which are products of first-stage adsorption unit 110.

Second-stage adsorption unit 112 includes one or more second-stage adsorption vessels 152 fluidly connected in a serial or parallel manner. Each of the one or more second-stage adsorption vessels 152 is filled with a second adsorbent. In some embodiments, the second adsorbent can include any adsorbent capable of selectively capturing hydrogen sulfide while rejecting carbon dioxide and nitrogen. In other embodiments, the second adsorbent can include any adsorbent having differences in breakthrough time between hydrogen sulfide and carbon dioxide, and between hydrogen sulfide and nitrogen. Non-limiting example materials used for the second adsorbent include molecular sieves (e.g., molecular sieve 3A, molecular sieve 4A, etc.) and hydrophobic zeolites having a framework such as an MFI type, a CHA type, an FAU type, an MOR type, a DDR type, an FER type, and an MWW type. Non-limiting example materials used for the second adsorbent also include hydrophobic zeolites such as MOFs and ZIFs. During an adsorption cycle, components of first outlet gas stream 134 are introduced through one or more second-stage adsorption vessels 152 of second-stage adsorption unit 112. Hydrogen sulfide is captured in the pores of the second adsorbent. Components other than hydrogen sulfide (that is, carbon dioxide and nitrogen) pass through the second adsorbent and are subsequently collected via second byproduct stream 138. During a regeneration cycle, components of second regeneration gas stream 146 enter one or more second-stage adsorption vessels 152 to regenerate the second adsorbent. Desorption occurs in one or more second-stage adsorption vessels 152, where the second adsorbent releases the captured hydrogen sulfide to produce second outlet gas stream 238 substantially in the absence of carbon dioxide and nitrogen.

In some embodiments, second-stage adsorption unit 112 includes at least three second-stage adsorption vessels 152 fluidly connected in a parallel manner. At any given moment during operation, one of the at least three second-stage adsorption vessels 152 is conducting the adsorption cycle, one of the at least three second-stage adsorption vessels 152 is conducting the regeneration cycle, and one of the at least three second-stage adsorption vessels 152 is standing by. In this manner, components of first outlet gas stream 134 can be continuously fed to second-stage adsorption unit 112 and a continuous flow of second outlet gas stream 140 can be produced from second-stage adsorption unit 112.

Air feed 142 can be any oxygen-containing gas suitable as regeneration gas for regenerating adsorbent materials. Non-limiting example gases for use as air feed 142 include air, oxygen-enriched air, pure oxygen, and combinations of the same. In at least one embodiment, air feed 142 is air. Gases in lieu of or in addition to air feed 142 may be employed as the regeneration gas. For instance, as discussed below with respect to FIGS. 2 and 3, the regeneration gas may be at least one of nitrogen or carbon dioxide.

Third heat exchanger 114 can be any heat exchanger (e.g., shell-and-tube heat exchanger, plate type heat exchanger, etc.) capable of heating a gas stream to a temperature at which adsorbent regeneration occurs in each of first-stage adsorption unit 110 and second-stage adsorption unit 112. Third heat exchanger 114 can heat air feed 142 such that each of first regeneration gas stream 144 and second regeneration gas stream 146 has a temperature between about 150° C. and about 350° C., alternately between about 200° C. and about 300° C., and alternately between about 230° C. and about 290° C. In at least one embodiment, the temperature of each of first regeneration gas stream 144 and second regeneration gas stream 146 is about 260° C.

Second outlet gas stream 140 includes hydrogen sulfide. Second outlet gas stream 140 has a hydrogen sulfide content of at least about 95 wt. %, alternately at least about 98 wt. %, and alternately at least about 99 wt. %. In some embodiments, second outlet gas stream 140 can be used as a feed gas for the Claus unit.

Figure 2:
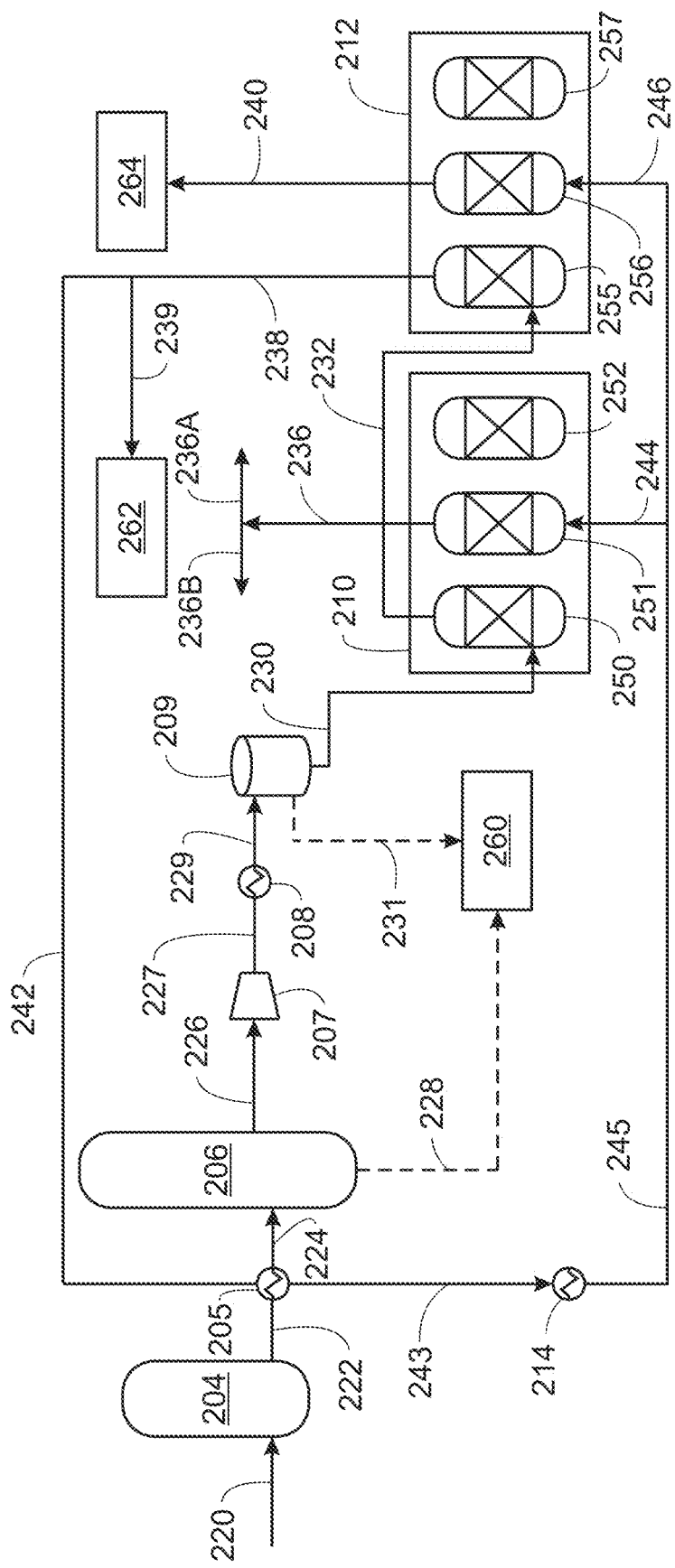
FIG. 2 is a diagram of a process for a Claus tail gas treatment system.

FIG. 2 is a schematic diagram of process 200 for an embodiment of the Claus tail gas treatment system. Process 200 can include hydrogenation reactor 204, first heat exchanger 205, quench tower 206, compressor 207, second heat exchanger 208, collection drum 209, first-stage adsorption unit 210, second-stage adsorption unit 212, and third heat exchanger 214.

In one embodiment, as shown in FIG. 2, tail gas stream 220 is introduced to hydrogenation reactor 204 to produce hydrogenated gas stream 222. Hydrogenated gas stream 222 is cooled via first heat exchanger 205 to produce hydrogenated gas stream 224 (cooled). Hydrogenated gas stream 224 is introduced to quench tower 206 to produce quenched gas stream 226 and first water condensate stream 228. Quenched gas stream 226 is pressurized by compressor 207 to produce quenched gas stream 227 (pressurized). Quenched gas stream 227 is cooled by second heat exchanger 208 to produce quenched gas stream 229 (cooled). Quenched gas stream 229 is introduced to collection drum 209 to produce second water condensate stream 231 and adsorption feed stream 230. First water condensate stream 228 and second water condensate stream 231 can be introduced to sour water stripper 260 for further processing. As used herein, the term "sour water stripper" refers to a device or apparatus that removes hydrogen sulfide from sour water, that is, water having hydrogen sulfide. For example, liquid water separated by a collection drum can include hydrogen sulfide. The liquid water can be introduced to a sour water stripper, where steam is injected into the sour water stripper to shift the chemical equilibria by heating the sour water such that hydrogen sulfide is released.

Adsorption feed stream 230 is introduced to first-stage adsorption vessel 250 of first-stage adsorption unit 210 to produce first outlet gas stream 232. First outlet gas stream 232 is introduced to second-stage adsorption vessel 255 of second-stage adsorption unit 212 to produce second byproduct stream 238. Second byproduct stream 238 can be separated into second byproduct stream 239 and second byproduct stream 242. In one instance, a conduit fitting (e.g., pipe tee) provides for splitting (dividing) the flow of stream 238 into the two streams 239 and 242. A flow control valve may be disposed along at least a conduit conveying the stream 239 or stream 242. Other conduit/control arrangements are applicable.

Second byproduct stream 242 is heated via first heat exchanger 205 to produce second byproduct stream 243 by exchanging heat from hydrogenated gas stream 222. Optionally, second byproduct stream 243 can be further heated via third heat exchanger 214 to produce second byproduct stream 245. Second byproduct stream 245 is separated into first regeneration gas stream 244 and second regeneration gas stream 246. First regeneration gas stream 244 is introduced to first-stage adsorption vessel 251 of first-stage adsorption unit 210 to produce first byproduct stream 236.

Second byproduct stream 239 and first byproduct stream 236 can be introduced to thermal oxidizer 262 for further processing. As used herein, the term "thermal oxidizer" refers to a device or apparatus that thermally decomposes certain gases at a predetermined temperature and releases them into the atmosphere. For example, a gas stream can be introduced to a thermal oxidizer, where any trace quantities of hydrogen sulfide included in the gas stream can be oxidized to sulfur dioxide and subsequently released to the atmosphere.

Second regeneration gas stream 246 is introduced to second-stage adsorption vessel 256 of second-stage adsorption unit 212 to produce second outlet gas stream 240. Second outlet gas stream 240 can be introduced to reaction furnace 264 of a Claus unit for further processing. As used herein, the term "reaction furnace" refers to a device or apparatus that is typically included in an upstream portion of a Claus unit, which initiates the conversion of hydrogen sulfide and other sulfur-containing compounds to elemental sulfur. The reaction furnace typically operates at a temperature greater than 850° C. such that hydrogen sulfide is converted to elemental sulfur.

Tail gas stream 220 includes a Claus tail gas. The Claus tail gas includes sulfur-containing compounds that were not fully recovered by the Claus unit. The sulfur-containing compounds can exist in forms such as elemental sulfur, hydrogen sulfide, sulfur oxides, and anionic counterparts of the same. Non-limiting example sulfur oxides include $SO$, $SO_2$, $SO_3$, $O_4$, $S_2O$, $S_2O_2$, $S_6O$, $S_6O_2$, $S_7O$, $S_7O_2$, $S_8O$, $S_9O$, and $S_{10}O$. The Claus tail gas can also include carbon dioxide, water, nitrogen, hydrogen, and combinations of the same.

Optionally, tail gas stream 220 can be preheated to a temperature at which hydrogenation reactions can occur in hydrogenation reactor 204. Tail gas stream 220 can be preheated to a temperature between about 200° C. and about 300° C., alternately between about 220° C. and about 280° C., and alternately between about 240° C. and about 260° C. In at least one embodiment, tail gas stream 220 can be preheated to a temperature of about 250° C.

Hydrogenation reactor 204 can be any reactor, catalytic or non-catalytic, capable of reducing the sulfur-containing compounds other than hydrogen sulfide to hydrogen sulfide. Optionally, hydrogen included in tail gas stream 220 can be used for reducing the sulfur-containing compounds to hydrogen sulfide. Optionally, a make-up hydrogen gas stream (not shown) can be introduced to hydrogenation reactor 204. Optionally, water can be produced as a byproduct during the hydrogenation reaction. As a result, hydrogenated gas stream 222 includes sulfur-containing compounds of substantially hydrogen sulfide only. Hydrogenated gas stream 222 can also include carbon dioxide, water, nitrogen, and combinations of the same.

First heat exchanger 205 can be any heat exchanger (e.g., shell-and-tube heat exchanger, plate type heat exchanger, etc.) capable of cooling a gas stream, in exchange of heating a separate gas stream, to a temperature suitable for the operation of quench tower 206. In the illustrated embodiment, first heat exchanger 205 may be characterized as a cross exchanger. First heat exchanger 205 can cool hydrogenated gas stream 222 such that hydrogenated gas stream 224 has a temperature between about 20° C. and about 170° C., alternately between about 30° C. and about 100° C., or alternately between about 40° C. and about 80° C. In at least one embodiment, the temperature of hydrogenated gas stream 224 is at least about 43° C. Hydrogenated gas stream 224 can include the sulfur-containing compounds, carbon dioxide, water, nitrogen, hydrogen, and combinations of the same. In some embodiments, first heat exchanger 205 can heat second byproduct stream 242 such that second byproduct stream 243 has a temperature between about 150° C. and about 350° C., alternately between about 200° C. and about 300° C., and alternately between about 230° C. and about 290° C.

In at least one embodiment, the temperature of second byproduct stream 243 is at least about 260° C. Optionally, third heat exchanger 214 can be used to heat second byproduct stream 243 to meet the temperature requirements of adsorbent regeneration for each of first-stage adsorption unit 210 and second-stage adsorption unit 212. Third heat exchanger 214 can be any heat exchanger (e.g., shell-and-tube heat exchanger, plate type heat exchanger, etc.) capable of heating a gas stream to a temperature at which adsorbent regeneration occurs in each of first-stage adsorption unit 210 and second-stage adsorption unit 212. Third heat exchanger 214 can heat second byproduct stream 243 such that second byproduct stream 245 (and each of first regeneration gas stream 244 and second regeneration gas stream 246) has a temperature between about 150° C. and about 350° C., alternately between about 200° C. and about 300° C., and alternately between about 230° C. and about 290° C. In at least one embodiment, the temperature of second byproduct stream 245 (and each of first regeneration gas stream 244 and second regeneration gas stream 246) is about 260° C. In other embodiments in view of the controlled temperature ramp in regeneration discussed below, the second byproduct stream 245 can be heated to different temperatures over time and up to 400° C.

Quench tower 206 can be any apparatus capable of condensing and recovering water. A significant portion of water included in hydrogenated gas stream 224 is condensed and substantially recovered via first water condensate stream 228. Although a significant portion of water included in hydrogenated gas stream 224 is removed, the resulting quenched gas stream 226 can still include residual amounts of gas phase water. Quenched gas stream 226 has a gas phase water content ranging between about 0 mol % and about 20 mol %, alternately between about 3 mol % and about 15 mol %, or alternately between about 4 mol % and about 10 mol %. In at least one embodiment, the gas phase water content of quenched gas stream 226 is about 8 mol %. Quenched gas stream 226 can also include hydrogen sulfide (that is, the hydrogen sulfide preexisting in the Claus tail gas or produced in hydrogenation reactor 204, or both), carbon dioxide, nitrogen, and combinations of the same. Quenched gas stream 226 has a temperature ranging between about 20° C. and about 170° C., alternately between about 30° C. and about 100° C., or alternately between about 40° C. and about 80° C. In at least one embodiment, the temperature of quenched gas stream 226 is about 43° C. The quench tower 206 may be labeled as a quench tower, quench vessel, quench column, quench condenser, quench heat exchanger, and so forth.

Compressor 207 can be any type of pressurizing device or apparatus capable of increasing the pressure of quenched gas stream 226. The compressor 207 can be a mechanical compressor. In at least one embodiment, compressor 207 is a diaphragm metering pump. The pressure of quenched gas stream 226 is increased via compressor 207 such that quenched gas stream 227 has a pressure ranging between about 1 bar and about 10 bar, alternately between about 1 bar and about 5 bar, or alternately between about 2 bar and about 4 bar. In at least one embodiment, the pressure of quenched gas stream 227 is about 3 bar. The unit "bar" as used herein is bar gauge ["bar(g)" or "barg"].

Second heat exchanger 208 can be any heat exchanger (e.g., shell-and-tube heat exchanger, plate type heat exchanger, etc.) capable of cooling a gas stream to a temperature at which adsorption occurs in first-stage adsorption unit 210. Second heat exchanger 208 can cool quenched gas stream 227 such that quenched gas stream 229 has a temperature ranging between about 0° C. and about 50° C., alternately between about 5° C. and about 40° C., and alternately between about 10° C. and about 30° C. In at least one embodiment, the temperature of quenched gas stream 229 is about 15° C. As quenched gas stream 227 is cooled, the gas phase water content of quenched gas stream 229 reduces to a range between about 0 mol % and about 10 mol %, alternately between about 0 mol % and about 5 mol %, or alternately between about 0 mol % and about 1 mol %. In at least one embodiment, the gas phase water content of quenched gas stream 229 is about 0.46 mol %. Quenched gas stream 229 can include hydrogen sulfide (that is, the hydrogen sulfide preexisting in the Claus tail gas or produced in hydrogenation reactor 204, or both), carbon dioxide, water, nitrogen, and combinations of the same.

Collection drum 209 can be any type of separation device (e.g., separation vessel) capable of separating a fluid stream into a gas phase stream and a liquid phase stream. Quenched gas stream 229 is separated in collection drum 209 to produce second water condensate stream 231 (a liquid phase stream) and adsorption feed stream 230 (a gas phase stream). Adsorption feed stream 230 can include hydrogen sulfide (that is, the hydrogen sulfide preexisting in the Claus tail gas or produced in hydrogenation reactor 204, or both), carbon dioxide, water, nitrogen, and combinations of the same.

In some embodiments, first water condensate stream 228 can include trace quantities of hydrogen sulfide dissolved in water collected from quench tower 206. In some embodiments, second water condensate stream 231 can include trace quantities of hydrogen sulfide dissolved in water collected from collection drum 209. Each of first water condensate stream 228 and second water condensate stream 231 can be introduced to sour water stripper 260 for further processing such as stripping hydrogen sulfide from water.

First-stage adsorption unit 210 includes first-stage adsorption vessels 250, 251, 252 fluidly connected in a parallel manner. At any given moment during operation, one of first-stage adsorption vessels 250, 251, 252 is undergoing an adsorption cycle, one of first-stage adsorption vessels 250, 251, 252 is undergoing a regeneration cycle, and one of first-stage adsorption vessels 250, 251, 252 is standing by. In this manner, components of adsorption feed stream 230 can be continuously fed to first-stage adsorption unit 210 and a continuous flow of first outlet gas stream 232 and first byproduct stream 236 can be produced from first-stage adsorption unit 210.

Each of first-stage adsorption vessels 250, 251, 252 is filled or packed with a first adsorbent. The first adsorbent may be in a bed of first adsorbent in the vessels 250, 251, 252. The first adsorbent can include any adsorbent capable of selectively capturing water from a wet gas stream (such as adsorption feed stream 230) while rejecting hydrogen sulfide, carbon dioxide, and nitrogen. Non-limiting example materials used for the first adsorbent include hydrophilic 3A molecular sieves as shown for example in U.S. Pat. No. 9,701,537. During the adsorption cycle, components of adsorption feed stream 230 are introduced through one of first-stage adsorption vessels 250, 251, 252. Water (and relatively small amount of hydrogen sulfide) is captured in the pores of the first adsorbent. Components other than water (that is, hydrogen sulfide, carbon dioxide, and nitrogen) pass through the first adsorbent to produce first outlet gas stream 232 substantially in the absence of water. During the regeneration cycle, components of first regeneration gas stream 244 (that is, carbon dioxide and nitrogen) enter one of first-stage adsorption vessels 250, 251, 252 to regenerate the first adsorbent. Desorption occurs in one of first-stage adsorption vessels 250, 251, 252, where the first adsorbent releases the captured water (and the relatively small amount of hydrogen sulfide) (and optionally trace quantities of carbon dioxide and nitrogen) which can be collected via first byproduct stream 236.

As shown in FIG. 2, first-stage adsorption vessel 250 is undergoing the adsorption cycle, first-stage adsorption vessel 251 is undergoing the regeneration cycle, and first-stage adsorption vessel 252 is in standby mode. During the adsorption cycle, components of adsorption feed stream 230 are introduced through first-stage adsorption vessel 250. Water (and relatively small amount of hydrogen sulfide) is captured in the pores of the first adsorbent. In some embodiments, trace quantities of carbon dioxide and nitrogen can be captured in the pores of the first adsorbent. Components other than water (that is, hydrogen sulfide, carbon dioxide, and nitrogen) pass through the first adsorbent to produce first outlet gas stream 232 substantially in the absence of water. During the regeneration cycle, components of first regeneration gas stream 244 (that is, carbon dioxide and nitrogen) enter first-stage adsorption vessel 251 to regenerate the first adsorbent. Desorption occurs in first-stage adsorption vessel 251, where the first adsorbent releases the captured water and the captured relatively small amount of hydrogen sulfide (and optionally trace quantities of carbon dioxide and nitrogen) which can be collected via first byproduct stream 236.

During the regeneration, first-stage absorption vessel 251 and associated system may gradually increase the temperature of the first adsorbent, such as via heat from first regeneration gas stream 244 as heated by first heat exchanger 205 (and optional third heat exchanger 214). For instance, during the regeneration cycle for first-stage absorption vessel 251, the first adsorbent in first-stage adsorption vessel 251 may be heated in a temperature ramp, such as progressively increasing in temperature from ambient temperature up to about 300° C. Ambient temperature may be the temperature of the environment surrounding the first-stage adsorption vessel 251 and its first adsorbent.

Implementations of the increasing temperature ramp may selectively desorb components from the first adsorbent to produce first byproduct stream 236 having the desorbed components, wherein the components desorbed during the first part (initial part) of the temperature ramp include primarily hydrogen sulfide. In embodiments, during the first part of the temperature ramp, first byproduct stream 236 may be provided as first byproduct stream 236A for feed to the reaction furnace 264 of the Claus unit. During a second part of the temperature ramp: (a) components desorbed from the first adsorbent in first-stage absorption vessel 251 include water; and/or (b) concentration of hydrogen sulfide in first byproduct stream 236 is less than a specified threshold value. The threshold value may be, for example, 10 parts per million (ppm) or 100 ppm. The second part of the temperature ramp is later in time and at greater temperatures than the first part of the temperature ramp. During the second part of the temperature ramp, first byproduct stream 236 may be provided as first byproduct stream 236B, for example, to the quench tower 206. First byproduct stream 236B can be introduced directly to the quench tower 206 or into the feed conduit upstream or downstream of heat exchanger 205.

Therefore, in general for a regeneration cycle of a first-stage adsorption vessel, the technique may involve heating the regenerating first-stage adsorption vessel (and first adsorbent therein) progressively in an increasing temperature ramp, such as from ambient temperature up to 300° C. As the temperature increases gradually, hydrogen sulfide is continuously desorbed while the adsorbed water initially in the temperature ramp generally remains adsorbed in the vessel (in the first adsorbent). First byproduct stream 236 more concentrated in hydrogen sulfide than water may be directed as first byproduct stream 236A as to the Claus-unit feed gas to reaction furnace 264. When the temperature of the first adsorbent reaches the level where water starts to breakthrough (desorb) into first byproduct stream 236 and/or when hydrogen concentration in first byproduct stream 236 is lower than a certain value, first byproduct stream 236 can be directed as first byproduct stream 236B to quench tower 206. Such generally avoids injection of inert regeneration gas to the Claus unit. The polishing removal of water or combination of hydrogen sulfide and water may be performed while circulating first byproduct stream 236B (as spent regeneration gas) to quench tower 206.

Second-stage adsorption unit 212 includes second-stage adsorption vessels 255, 256, 257 fluidly connected in a parallel manner. At any given moment during operation, one of second-stage adsorption vessels 255, 256, 257 is undergoing an adsorption cycle, one of second-stage adsorption vessels 255, 256, 257 is undergoing a regeneration cycle, and one of second-stage adsorption vessels 255, 256, 257 is standing by. In this manner, components of first outlet gas stream 232 can be continuously fed to second-stage adsorption unit 212 and a continuous flow of second outlet gas stream 240 and second byproduct stream 238 can be produced from second-stage adsorption unit 212.

Each of second-stage adsorption vessels 255, 256, 257 is filled or packed with a second adsorbent. The second adsorbent may be configured as an adsorbent bed in the vessels 255, 256, 257. In some embodiments, the second adsorbent can include any adsorbent capable of selectively capturing hydrogen sulfide while rejecting carbon dioxide and nitrogen. In other embodiments, the second adsorbent can include any adsorbent having differences in breakthrough time between hydrogen sulfide and carbon dioxide, and between hydrogen sulfide and nitrogen. Non-limiting example materials used for the second adsorbent include molecular sieves (e.g., molecular sieve 3A, molecular sieve 3B, etc.) and hydrophobic zeolites having a framework such as an MFI type, a CHA type, an FAU type, an MOR type, a DDR type, an FER type, and an MWW type. Non-limiting example materials used for the second adsorbent also include hydrophobic zeolites such as MOFs and ZIFs. In at least one embodiment, the second adsorbent includes a Cu—Y type zeolite, which is a derivative of an FAU type zeolite including copper cations as counterions. In other embodiments, the second adsorbent is molecular sieve 4A. During the adsorption cycle, components of first outlet gas stream 232 are introduced through one or more second-stage adsorption vessels 255, 256, 257. Hydrogen sulfide is captured in the pores of the second adsorbent. Components other than hydrogen sulfide (that is, carbon dioxide and nitrogen) pass through the second adsorbent and are subsequently collected via second byproduct stream 238. During the regeneration cycle, components of second regeneration gas stream 246 (that is, carbon dioxide and nitrogen) enter one or more second-stage adsorption vessels 255, 256, 257 to regenerate the second adsorbent. Desorption occurs in one or more second-stage adsorption vessels 255, 256, 257, where the second adsorbent releases the captured hydrogen sulfide (and optionally trace quantities of carbon dioxide and nitrogen) to produce second outlet gas stream 240. Second outlet gas stream 240 includes hydrogen sulfide, carbon dioxide, and nitrogen.

As shown in FIG. 2, second-stage adsorption vessel 255 is undergoing the adsorption cycle, second-stage adsorption vessel 256 is undergoing the regeneration cycle, and second-stage adsorption vessel 257 is in standby mode. During the adsorption cycle, components of first outlet gas stream 232 are introduced through second-stage adsorption vessel 255. Hydrogen sulfide is captured in the pores of the second adsorbent. In some embodiments, trace quantities of carbon dioxide and nitrogen can be captured in the pores of the second adsorbent. Components other than hydrogen sulfide (that is, carbon dioxide and nitrogen) pass through the second adsorbent to produce second byproduct stream 238 substantially in the absence of hydrogen sulfide. During the regeneration cycle, components of second regeneration gas stream 246 (that is, carbon dioxide and nitrogen) enter second-stage adsorption vessel 256 to regenerate the second adsorbent. Desorption occurs in second-stage adsorption vessel 256, where the second adsorbent releases the captured hydrogen sulfide (and optionally trace quantities of carbon dioxide and nitrogen) which can be collected via second outlet gas stream 240.

Second outlet gas stream 240 includes hydrogen sulfide, carbon dioxide, and nitrogen. Second outlet gas stream 240 has a hydrogen sulfide content ranging between about 0 wt. % and about 99 wt. %, alternately between about 5 wt. % and about 70 wt. %, alternately between about 5 wt. % and about 50 wt. %, alternately between about 5 wt. % and about 30 wt. %, and alternately between about 10 wt. % and about 20 wt. %. In at least one embodiment, second outlet gas stream 240 has a hydrogen sulfide content of about 13.3 wt. %. Second outlet gas stream 240 has a carbon dioxide content ranging between about 0 wt. % and about 99 wt. %, alternately between about 20 wt. % and about 95 wt. %, alternately between about 30 wt. % and about 90 wt. %, alternately between about 50 wt. % and about 80 wt. %, and alternately between about 60 wt. % and about 70 wt. %. In at least one embodiment, second outlet gas stream 240 has a carbon dioxide content of about 66.7 wt. %. Second outlet gas stream 240 has a nitrogen content ranging between about 0 wt. % and about 99 wt. %, alternately between about 5 wt. % and about 70 wt. %, alternately between about 5 wt. % and about 50 wt. %, alternately between about 10 wt. % and about 30 wt. %, and alternately between about 15 wt. % and about 25 wt. %. In at least one embodiment, second outlet gas stream 240 has a nitrogen content of about 20.0 wt. %. In some embodiments, second outlet gas stream 240 can be used as a feed gas for the Claus unit. As shown in FIG. 2, second outlet gas stream 240 can be introduced to reaction furnace 264 of the Claus unit.

Figure 3:
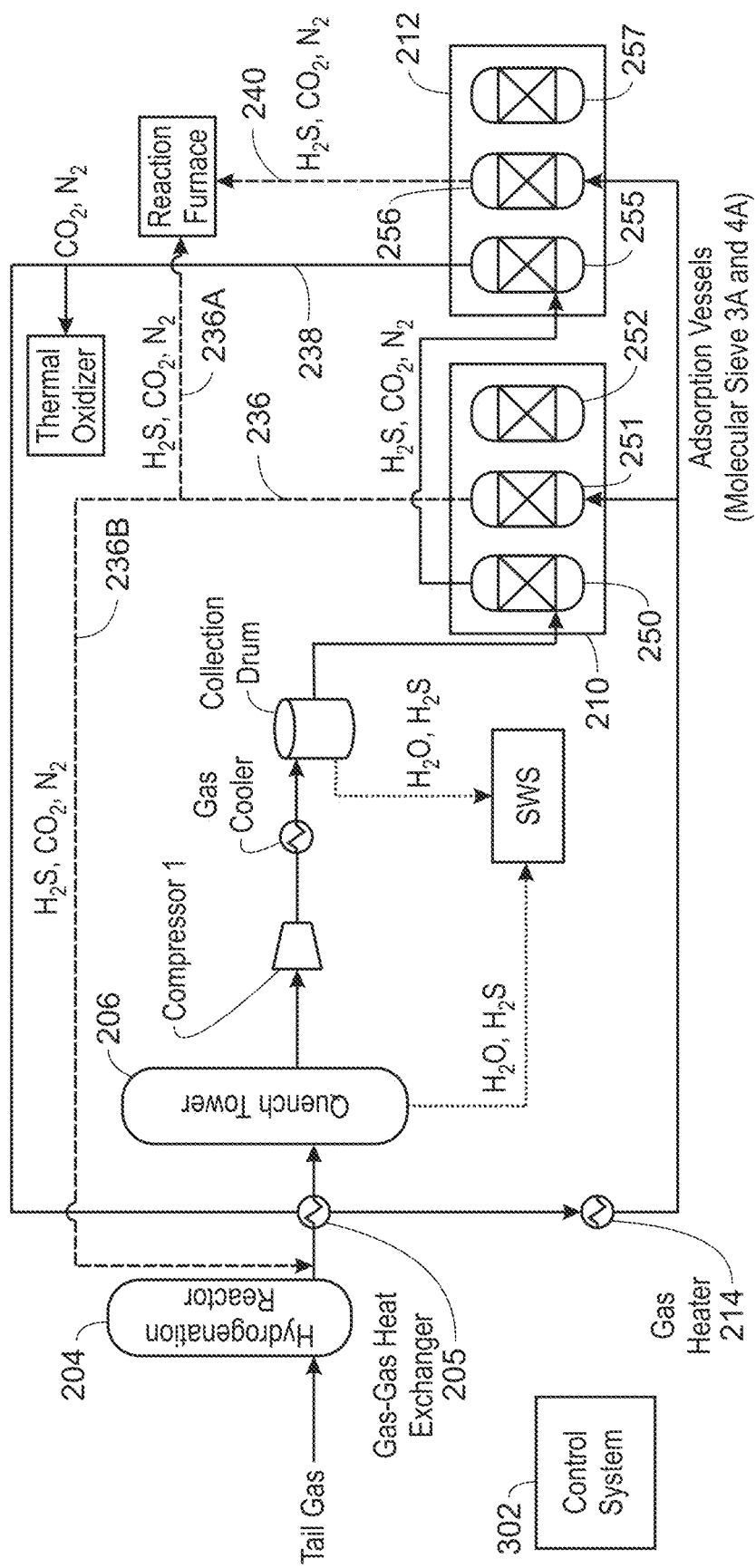
FIG. 3 is a diagram of a Claus tail gas treatment system.

FIG. 3 is a system 300 that treats Claus tail gas and can be generally analogous to the process 200 of FIG. 2. In implementations, FIG. 3 is a process flow diagram, in part, to describe in particular a temperature-ramping regeneration scheme utilizing a slipstream of carbon dioxide and nitrogen. As used herein, the term "slipstream" may mean a diversion of a small amount (e.g., less than 20%) of a main stream.

The system 300 includes hydrogenation reactor 204 (e.g., a reactor vessel) to receive the Claus tail gas and hydrogenate sulfur-containing compounds in the Claus tail gas into hydrogen sulfide to produce hydrogenated gas including hydrogen sulfide, water, and at least one of carbon dioxide or water. In implementations, the hydrogenated gas typically does not include sulfur-containing compounds other than hydrogen sulfide. In some implementations, any sulfur-containing compounds other than hydrogen sulfide in the hydrogenated gas may be only at trace amounts (or not readily measurable) in the hydrogenated gas.

The system 300 includes quench tower 206 to receive the hydrogenated gas and condense water in the hydrogenated gas to produce quenched gas having sulfide, water, and at least of one carbon dioxide or nitrogen. The hydrogenated gas in routed to the quench tower 206 may be cooled via first heat exchanger 205. In the quench tower, condensed water (with some hydrogen sulfide) is recovered as water condensate and may be sent, for example, to a sour water stripper (SWS) column.

The system 300 includes a first-stage adsorption vessel to operate in an adsorption cycle to receive the quenched gas discharged from quench tower 206 and adsorb water from the quenched gas onto first adsorbent. In particular, the hydrogenated gas may be sent to the first-stage adsorption vessel operating in an adsorption cycle. For instance, the quenched gas discharged from quench tower 206 may be sent to first-stage adsorption unit 250 that is depicted as operating in an adsorption cycle. FIG. 3 shows first-stage adsorption vessel 250 in the adsorption cycle.

In the illustrated embodiment, first-stage adsorption unit 210 includes at least three first-stage adsorption vessels. In the depicted state of operation, first-stage adsorption vessel 250 is in an adsorption cycle, first-stage adsorption vessel 251 is in a regeneration cycle, and first-stage adsorption vessel 252 is in a standby cycle.

An adsorption vessel operating in an adsorption cycle may be labeled as adsorbing adsorption vessel while in the adsorption cycle. An adsorption vessel operating in a regeneration cycle may be labeled as a regenerating adsorption vessel while in a regeneration cycle. The first adsorbent in the first-stage adsorption vessels 250, 251, 252 may be a molecular sieve, such as molecular sieve 3A.

The quenched gas prior to delivery to first-stage adsorption vessel 250 may be compressed (increased in pressure) via a compressor (e.g., mechanical compressor, metering diaphragm pump, etc.), cooled via a gas-cooler heat exchanger, and routed through a collection drum (e.g., vessel). Water in the quench gas condensed via the pressure increase and cooling and may be recovered from the collection drum as water condensate (e.g., with some hydrogen sulfide) to the SWS.

As depicted, first-stage adsorption vessel 250 receives the quenched gas and adsorbs water from the quenched gas onto first adsorbent to produce a first outlet gas 232 having hydrogen sulfide and at least one of carbon dioxide or nitrogen. In implementations, a significant portion (most or substantially all) of the water in the quenched gas is adsorbed onto the first adsorbent in first-stage adsorption vessel 250 operating in the adsorption cycle. A relatively small amount of hydrogen sulfide may be adsorbed from the quench gas onto the first adsorbent. In implementations, the first adsorbent in first-stage adsorption vessel 250 adsorbs water while passes hydrogen sulfide, carbon dioxide, and nitrogen to form first outlet gas 232 during an adsorption cycle. In implementations, first outlet gas 232 does not include water, or includes only trace or immeasurable amounts of water.

The system 300 includes second-stage adsorption vessel 255 to receive first outlet gas 232 in an adsorption cycle and adsorb hydrogen sulfide from first outlet gas 232 onto second adsorbent to produce second byproduct stream 230 having at least one of carbon dioxide or nitrogen. The second adsorbent may adsorb hydrogen sulfide while passes carbon dioxide and nitrogen to form second byproduct stream 238 during an adsorption cycle. In implementations, second byproduct stream 238 does not include hydrogen sulfide, or includes trace or immeasurable amounts of hydrogen sulfide.

In the illustrated embodiment, second-stage adsorption unit 212 includes at least three second-stage adsorption vessels. In the depicted state of operation, second-stage adsorption vessel 255 is in an adsorption cycle, second-stage adsorption vessel 256 is in a regeneration cycle, and second-stage adsorption vessel 257 is in a standby cycle. The second adsorbent in second-stage adsorption vessels 255, 256, 257 may be a molecular sieve, such as molecular sieve 4A.

Some of second byproduct stream 238 may be sent to a thermal oxidizer and the remainder of second byproduct stream 238 may be regeneration gas. In implementations, a majority of second byproduct stream 238 is sent to the thermal oxidizer and the amount of second byproduct stream 238 utilized as regeneration gas may be characterized as a slipstream of the second byproduct stream 238.

This regeneration gas (e.g., slipstream of second byproduct stream 238) may be heated in a heat exchanger with a utility heating medium (e.g., steam, steam condensate, oil, or other heat transfer fluid) or in the heat exchanger with a process stream as the heating medium. In the illustrated embodiment, the regeneration gas is heated in first heat exchanger 205 with the process-stream hydrogenated gas as the heating medium. First heat exchanger 205 is generally a gas-gas heat exchanger. The heat transfer with the regeneration gas is a cross exchange with the hydrogenated gas from the hydrogenation reactor 204 in route to the quench tower 206. The regeneration gas may also be additionally heated in third heat exchanger 214 (e.g., as a gas heater). The heat transfer fluid for third heat exchanger 214 may be, for example, steam (e.g., condensing steam), steam condensate, oil, or other heat transfer fluid.

A first portion of the slipstream of second byproduct stream 238 as heated may flow as regeneration gas to the first-stage adsorption unit 210. A second portion of the slipstream of second byproduct stream 238 as heated may flow as regeneration gas to the second-stage adsorption unit 212. A third portion of second byproduct stream 238 (e.g., not heated) may be processed in a thermal oxidizer.

As depicted for operation in FIG. 3, the system 300 includes first-stage adsorption vessel 251 operating in a regeneration cycle to receive a first portion of the second byproduct stream 238 as regeneration gas and heat first adsorbent in first-stage adsorption vessel 251. The first adsorbent may be heated per a temperature ramp to selectively desorb components from the first adsorbent in first-stage adsorption vessel 251 to produce first byproduct stream 236 having desorbed components. First byproduct stream 236 also includes at least one of carbon dioxide or nitrogen. In implementations, the components desorbed during a first part of the temperature ramp includes primarily hydrogen sulfide. The first part of the temperature ramp may be an initial part of the temperature ramp. In operation, first-stage adsorption vessel 251 discharges first byproduct stream 236 as first byproduct stream 236A to a reaction furnace of a Claus unit during the first part of the temperature ramp. In contrast, first-stage adsorption vessel 251 discharges first byproduct stream 236 as first byproduct stream 236B to quench tower 206 during a second part of the temperature ramp. In implementations during the second part of the temperature ramp, the components desorbed from the first adsorbent include water or the concentration of hydrogen sulfide in the first byproduct stream 236 is less than a threshold value, or both. The second part of the temperature ramp is later in time and generally at greater temperatures than the first part of the temperature ramp. In the control of the temperature ramp to give desired desorption characteristics and timing, the overall length of time for the temperature ramp and the upper temperature value (e.g. 300° C.) of the temperature ramp may be specified. The increment of delta temperature increase per time of the temperature ramp may be specified.

Thus, embodiments of the present techniques may involve for a regeneration cycle of a first-stage adsorption vessel to heat the first adsorbent in the regenerating first-stage adsorption per an increasing temperature ramp, such as from ambient temperature up to 300° C. As the temperature increases gradually, hydrogen sulfide is initially desorbed while the adsorbed water initially generally remains adsorbed in the first adsorbent. Thus, first byproduct stream 236 will initially be more concentrated in hydrogen sulfide than water and thus may beneficially may be routed as first byproduct stream 236A as to the Claus-unit feed gas for the Claus reaction furnace. When the temperature of the first adsorbent reaches the level where water starts to desorb (breakthrough) into first byproduct stream 236 and/or when hydrogen concentration in first byproduct stream 236 is lower than a certain value, first byproduct stream 236 can be redirected away from the Claus reaction furnace. For instance, during this second part of the temperature ramp, first byproduct stream 236 can be beneficially routed as first byproduct stream 236B to quench tower 206 for handling of the water and avoiding introduction of inert components of the regeneration gas to the Claus reaction furnace.

The system 300 includes second-stage adsorption vessel 256 to receive a second portion of second byproduct stream 238 in a regeneration cycle and desorb hydrogen sulfide from second adsorbent in second-stage adsorption vessel 256 into the second portion of second byproduct stream 238 to produce second outlet gas 240 having hydrogen sulfide. Second-stage adsorption vessel 256 may discharge second outlet gas 240, for example, to a Claus unit for feed to a reaction furnace of the Claus unit.

The system 300 may include the thermal oxidizer (or other incineration or combustion system) to receive a third portion of the second byproduct stream 238. The thermal oxidizer may also be labeled as a thermal incinerator. A thermal oxidizer may decompose gas at high temperature. Thermal oxidizers may be a direct-fired thermal oxidizer, regenerative thermal oxidizer (RTO), catalytic oxidizer, and so on.

The depicted system 300 that treats Claus tail gas may also include a control system 302. In implementations, the control system 302 may be integrated with (or communicate with) the control system for the Claus SRU. The control system 302 may facilitate or direct operation of the system 300, such as the supply or discharge of flow streams (including flow rate) and associated control valves, control of operating temperatures and operating pressures, and control of hydrogenation reactor 204, quench tower 206, adsorption vessels, heat exchangers, and so on. The control system 302 may include a processor and memory storing code (e.g., logic, instructions, etc.) executed by the processor to perform calculations and direct operations of the system 300. The processor (hardware processor) may be one or more processors and each processor may have one or more cores. The processor(s) may include a microprocessor, central processing unit (CPU), graphic processing unit (GPU), controller card, circuit board, or other circuitry. The memory may include volatile memory (for example, cache or random access memory), nonvolatile memory (for example, hard drive, solid-state drive, or read-only memory), and firmware. The control system 302 may include a desktop computer, laptop computer, computer server, control panels, programmable logic controller (PLC), distributed computing system (DSC), controllers, actuators, or control cards. The control system 302 may be communicatively coupled to a remote computing system that performs calculations and provides direction. The control system 302 may receive user input or remote-computer input that specifies the set points of control devices or other control components in the acetic-acid production system 300. In some implementations, the control system 302 may calculate or otherwise determine set points of control devices. Some implementations may include a control room that can be a center of activity, facilitating monitoring and control of the process or facility. The control room may contain a human machine interface (HMI), which is a computer, for example, that runs specialized software to provide a user-interface for the control system 302. The HMI may vary by vendor and present the user with a graphical version of the remote process. There may be multiple HMI consoles or workstations, with varying degrees of access to data. The control system 302 may also or instead employ local control (e.g., distributed controllers, local control panels, etc.) distributed in the system 300.

The control system 302 may facilitate control of the temperature ramp in the regeneration of the first-stage adsorption vessels and associated desorption of the first adsorbent. For example, the control system 302 may provide for an overall length of time for the temperature ramp and for the upper temperature value of the temperature ramp. The control system 302 may provide for a specified increment of delta temperature increase per time of the regenerating first-stage adsorption vessel (vessel 251 in the current operation of FIG. 3) or of the first adsorbent in the regenerating first-stage adsorption vessel. The first-stage adsorption vessels 250, 251, 252 may have temperature elements or sensors, such as thermocouples (e.g., in a thermowell), resistance temperature detectors (RTD), etc., to measure or indicate temperature for feedback to the control system 302.

To give the desired or specified overall time length and/or increasing temperature increment per time of the temperature ramp, the control system 302 may: (1) direct flow control valves to modulate (adjust or maintain at set point) flow rate (e.g., mass per time, volume per time, etc.) of the regeneration gas; and/or (2) control the temperature of the regeneration gas via the heating by first heat exchanger 205 and third heat exchanger 214. Other control schemes are applicable. Control parameters, such as the desired amount of incremental increase in temperature of the first adsorbent, may be input by a user to the control system 302.

Lastly, FIGS. 2-3 depict utilizing carbon dioxide and nitrogen as regeneration gas. In particular, regeneration of the adsorption vessels utilizes a portion (e.g., slipstream) of relatively clean gas (carbon dioxide and water) from $H_2S$-removal adsorption vessels. However, aspects of the temperature-ramping regeneration techniques disclosed herein may be applicable to other regeneration gases or schemes including: (1) regeneration of the water-removal stage with clean gas (carbon dioxide) and the $H_2S$-removal stages by utilizing sales gas (sales-quality natural gas); (2) regeneration of the adsorption vessels by utilizing nitrogen gas coming from a nitrogen separation unit (cryogenic unit); (3) regeneration of the adsorption vessels by vacuum; and (4) utilization of air as regeneration gas as depicted in FIG. 1, and so on.

There are various technologies to reduce sulfur dioxide emissions from sulfur recovery units (SRUs). Due to relatively large flow and low pressure of tail gas, tail gas treatment units can be expensive to build and operate. As discussed above with respect to the preceding figures, disclosed herein is a process and system that allows for a total sulfur recovery of up to 99.9+% in implementations. The process captures preferentially hydrogen sulfide from the tail gas mixture after hydrogenation and recycles the hydrogen sulfide back to the Claus furnace. The water-removal adsorption vessels capture and remove water from the tail gas while the $H_2S$ adsorption vessels selectively capture hydrogen sulfide and recycle the hydrogen sulfide to the front end of the Claus plant. In particular implementations, the first and second stage adsorption vessels may be filled with molecular sieve 3A and 4A, respectively. Embodiments herein include adsorption-based Claus tail gas treatment (e.g., having two-stage adsorption or two-step adsorption) through regeneration temperature ramping including applying a controlled temperature increase during the adsorbent regeneration.

Figure 4:
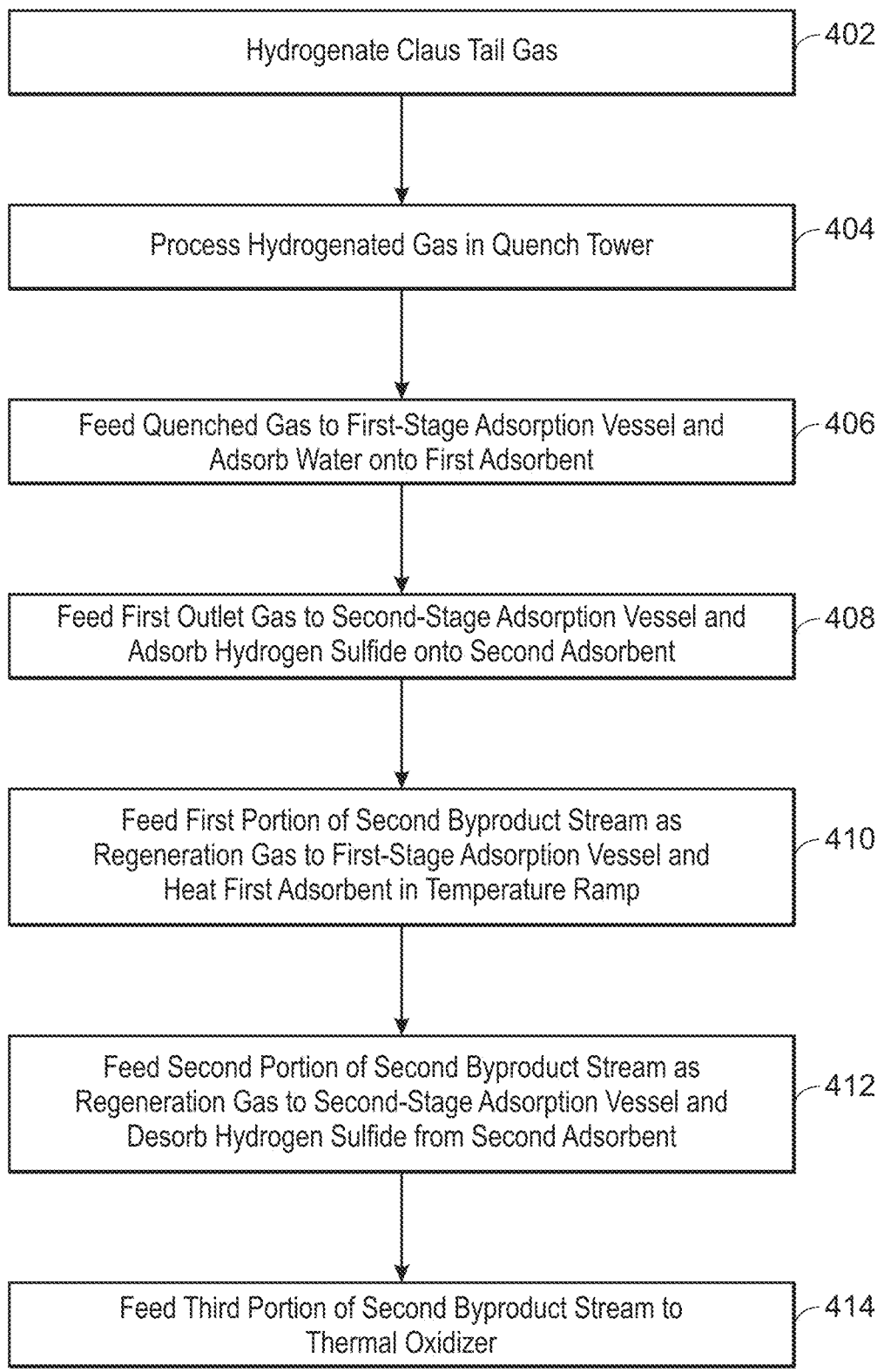
FIG. 4 is a block flow diagram of a method for sulfur recovery.

FIG. 4 is a method 400 for sulfur recovery. The method 400 may be a method of Claus tail gas treatment or a method of operating a Claus tail gas treatment system.

At block 402, the method includes hydrogenating Claus tail gas to produce hydrogenated gas having hydrogen sulfide, water, and at least of one carbon dioxide or nitrogen. In implementations, the hydrogenated gas includes little or no sulfur-containing compounds other than hydrogen sulfide. The hydrogenating of the Claus tail gas may involve converting sulfur-containing compounds in the Claus tail gas into hydrogen sulfide in a hydrogenation reactor to produce the hydrogenated gas having hydrogen sulfide, water, and at least one of carbon dioxide or nitrogen. In other words, the hydrogenating of the Claus tail gas may involve feeding the Claus tail gas having sulfur-containing compounds to a hydrogenation reactor and converting the sulfur-containing compounds in the hydrogenation reactor to hydrogen sulfide to produce the hydrogenated gas.

At block 404, the method includes processing the hydrogenated gas in a quench tower to produce quenched gas having hydrogen sulfide, water, and at least of one carbon dioxide or nitrogen. The processing of the hydrogenated gas in a quench tower may involve feeding the hydrogenated gas to the quench tower, condensing water in the hydrogenated gas in the quench tower, and removing water condensate from the quench tower to produce the quenched gas. The quenched gas may be the hydrogenated gas without the water that is removed as water condensate.

At block 406, the method includes feeding the quenched gas to an adsorbing first-stage adsorption vessel. The method may include subjecting the quenched gas in route to the adsorbing first-stage adsorption vessel to processing before the quench gas reaches the adsorbing first-stage adsorption vessel. Such processing may include, for example, compression (pressure increase), cooling, and removal of condensed water.

The adsorbing first-stage adsorption vessel is labeled as "adsorbing" because that particular first-stage adsorption vessel is currently in an adsorption cycle. The method includes adsorbing water from the quenched gas onto first adsorbent in the adsorbing first-stage adsorption vessel to produce a first outlet gas. The first outlet gas includes hydrogen sulfide and at least one of carbon dioxide or nitrogen. The first adsorbent in the adsorbing first-stage adsorption vessel may generally adsorb water while passing hydrogen sulfide, carbon dioxide, and nitrogen to form the first outlet gas during an adsorption cycle. In implementations, the first outlet gas includes little or no water. A significant portion (most or all) of the water in the quenched gas is adsorbed onto the first adsorbent in the adsorbing first-stage adsorption vessel. A relatively small amount of hydrogen sulfide may be adsorbed onto the first adsorbent. The first adsorbent in the first-stage adsorption vessels may be a molecular sieve, such as molecular sieve 3A.

At block 408, the method includes feeding the first outlet gas to an adsorbing second-stage adsorption vessel. The adsorbing second-stage adsorption vessel is labeled as "adsorbing" because that particular second-stage adsorption vessel is currently operating in an adsorption cycle. The method includes adsorbing hydrogen sulfide from the first outlet gas onto second adsorbent in the adsorbing second-stage adsorption vessel to produce a second byproduct stream having at least one of carbon dioxide or nitrogen. The second adsorbent may generally adsorb hydrogen sulfide while passing carbon dioxide and nitrogen to form the second byproduct stream during an adsorption cycle. In implementations, the second byproduct stream does not include hydrogen sulfide. The second adsorbent in the second-stage adsorption vessels may be a molecular sieve, such as molecular sieve 4A.

At block 410, the method includes feeding a first portion of the second byproduct stream (e.g., primarily at least one of carbon dioxide or nitrogen) as regeneration gas to a regenerating first-stage adsorption vessel. The regenerating first-stage adsorption vessel is labeled as "regenerating" because that particular first-stage adsorption vessel is currently operating in a regeneration cycle. The method includes heating the regenerating first-stage adsorption vessel in a temperature ramp to selectively desorb components from first adsorbent in the regenerating first-stage adsorption vessel to produce a first byproduct stream having desorbed components and at least one of carbon dioxide or nitrogen. The components desorbed during a first part of the temperature ramp include primarily hydrogen sulfide. The first part of the temperature ramp may be an initial part of the temperature ramp. In implementations, the first byproduct stream may be fed to a reaction furnace of a Claus unit during the first part of the temperature ramp.

At the beginning of (or during) a second part of the temperature ramp at least one of the two following conditions may be experienced: (1) the components desorbed from the first adsorbent in the regenerating first-stage adsorption vessel may include water; or (2) concentration of hydrogen sulfide in the first byproduct stream is less than a threshold value. The second part of the temperature ramp is later in time and may generally be at greater temperatures than the first part of the temperature ramp. During the second part of the temperature ramp, the first byproduct stream may be fed, for example, to the quench tower.

A first-stage adsorption unit may include the adsorbing first-stage adsorption vessel and the regenerating first-stage adsorption vessel, wherein the adsorbing first-stage adsorption vessel is a first-stage adsorption vessel operationally in an adsorption cycle, and wherein the regenerating first-stage adsorption vessel is a first-stage adsorption vessel operationally in a regeneration cycle. The first-stage adsorption unit may include a first-stage adsorption vessel operationally in standby.

At block 412, the method may include feeding a second portion of the second byproduct stream to a regenerating second-stage adsorption vessel and desorbing hydrogen sulfide from second adsorbent in the regenerating second-stage adsorption vessel into the second portion of the second byproduct stream to produce a second outlet gas including hydrogen sulfide. The method may include providing the second outlet gas as feed gas for a reaction furnace of a Claus unit that generated or provided the Claus tail gas.

At block 414, the method includes feeding a third portion of the second byproduct stream to a thermal oxidizer or other incinerator. In certain implementations, the third portion of the second byproduct stream is the majority of the second byproduct stream. In those implementations, a slipstream of the second byproduct stream provides for the first and second portions of the second byproduct stream fed as regeneration gas.

Figure 5:
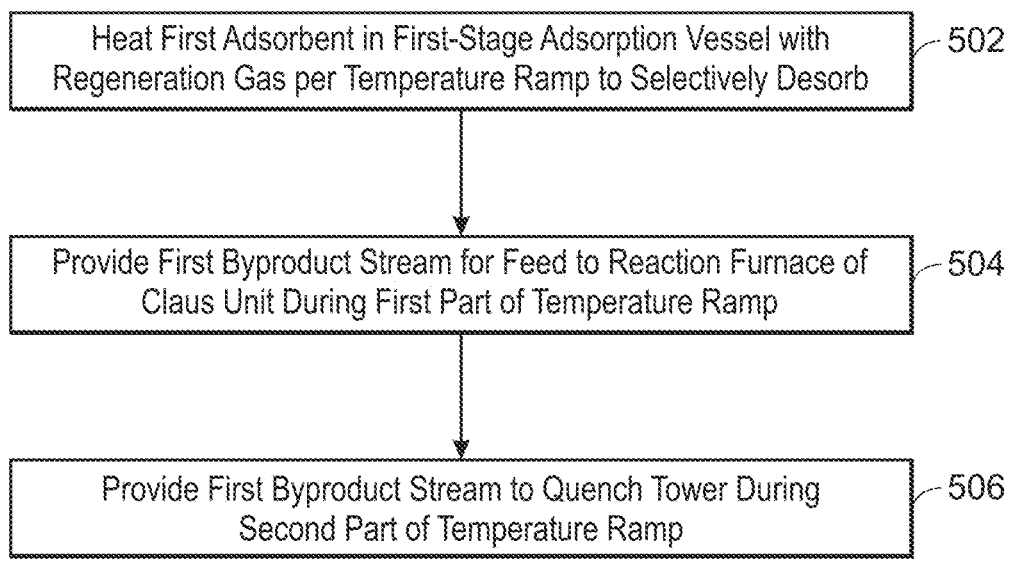
FIG. 5 is a block flow diagram of a method of regenerating a first-stage adsorption vessel.

FIG. 5 is a method 500 of regenerating a first-stage adsorption vessel as discussed. The method 500 may correspond to block 410 of FIG. 4. An increasing temperature ramp of the regenerating first-stage adsorption vessel is implemented to desorb hydrogen sulfide initially (for feed to the Claus reaction furnace) and then to desorb water later in the temperature ramp (for return to the quench tower). A control system may facilitate control of the temperature ramp. As discussed, the flow rate or temperature, or both, of the regeneration gas may be adjusted to give the desired or specified temperature ramp.

At block 502, the method includes feeding a first portion of the aforementioned second byproduct stream as regeneration gas and heating the regenerating first-stage adsorption vessel in a temperature ramp to selectively desorb components from the first adsorbent to produce a first byproduct stream having desorbed components. The first byproduct stream also includes at least one of carbon dioxide or nitrogen that entered with the regeneration gas. The components desorbed during a first part (initial part) of the temperature ramp may include primarily hydrogen sulfide.

At block 504, the method includes providing the first byproduct stream (e.g., concentrated in hydrogen sulfide as compared to water) for feed to the reaction furnace of the Claus during the first part of the temperature ramp. This operation may continue during the first part of the temperature ramp. However, as the operation enters the next part or second part of the temperature ramp, more water than hydrogen sulfide may begin to desorb. Also, the concentration of hydrogen sulfide in the first byproduct stream is less than a threshold value (e.g., 100 ppm).

At block 506 the method includes providing the first byproduct stream (e.g., having water and lower concentration of hydrogen sulfide) to the quench tower. Such diversion of the first byproduct stream (spent regeneration gas) away from the Claus reaction furnace beneficially avoids introduction of inert components in the regeneration gas to the Claus reaction furnace. Further, the quench tower is equipped to handle the water in the first byproduct stream.

An embodiment is a method for sulfur recovery, involving hydrogenating Claus tail gas to produce hydrogenated gas including hydrogen sulfide, water, and at least of one of carbon dioxide or nitrogen, and processing the hydrogenated gas in a quench tower to produce quenched gas including hydrogen sulfide, water, and at least one of carbon dioxide or nitrogen. The hydrogenating the Claus tail gas may involve converting sulfur-containing compounds in the Claus tail gas into hydrogen sulfide in a hydrogenation reactor to produce the hydrogenated gas including hydrogen sulfide, water, and at least one of carbon dioxide or nitrogen. The hydrogenating the Claus tail gas may involve feeding the Claus tail gas including sulfur-containing compounds to a hydrogenation reactor and converting the sulfur-containing compounds in the hydrogenation reactor to hydrogen sulfide to produce the hydrogenated gas including hydrogen sulfide, water, and at least one of carbon dioxide or nitrogen. The processing of the hydrogenated gas in the quench tower may involve feeding the hydrogenated gas to the quench tower, condensing water in the hydrogenated gas in the quench tower, and removing water condensate from the quench tower to produce the quenched gas, wherein the quenched gas includes the hydrogenated gas without the water condensate removed.

The method includes feeding the quenched gas to an adsorbing first-stage adsorption vessel, and adsorbing water from the quenched gas onto first adsorbent in the adsorbing first-stage adsorption vessel to produce a first outlet gas. The first outlet gas includes hydrogen sulfide and at least one of carbon dioxide or nitrogen. The method includes feeding the first outlet gas to an adsorbing second-stage adsorption vessel, and adsorbing hydrogen sulfide from the first outlet gas onto second adsorbent in the adsorbing second-stage adsorption vessel to produce a second byproduct stream comprising at least one of carbon dioxide or nitrogen. In implementations, a significant portion of the water in the quenched gas is adsorbed onto the first adsorbent in the adsorbing first-stage adsorption vessel, wherein the first adsorbent in the adsorbing first-stage adsorption vessel adsorbs water while passes hydrogen sulfide, carbon dioxide, and nitrogen to form the first outlet gas during an adsorption cycle, and wherein the second adsorbent adsorbs hydrogen sulfide while passes carbon dioxide and nitrogen to form the second byproduct stream during an adsorption cycle.

The method includes feeding a first portion of the second byproduct stream as regeneration gas to a regenerating first-stage adsorption vessel, and heating the regenerating first-stage adsorption vessel in a temperature ramp to selectively desorb components from first adsorbent in the regenerating first-stage adsorption vessel to produce a first byproduct stream including desorbed components (and at least one of carbon dioxide or nitrogen). The components desorbed during a first part of the temperature ramp include primarily hydrogen sulfide. The method may include feeding the first byproduct stream to a reaction furnace of a Claus unit during the first part of the temperature ramp, wherein the first part of the temperature ramp is an initial part of the temperature ramp. In implementations, during a second part of the temperature ramp, the components desorbed from the first adsorbent in the regenerating first-stage adsorption vessel includes water or concentration of hydrogen sulfide in the first byproduct stream is less than a threshold value, or both, wherein the second part of the temperature ramp is later in time and at greater temperatures than the first part of the temperature ramp. The method may include feeding the first byproduct stream to the quench tower during a second part of the temperature ramp.

The method may include feeding a second portion of the second byproduct stream to a regenerating second-stage adsorption vessel and desorbing hydrogen sulfide from second adsorbent in the regenerating second-stage adsorption vessel into the second portion of the second byproduct stream to produce a second outlet gas including hydrogen sulfide. The method may include providing the second outlet gas as feed gas for a reaction furnace of a Claus unit that generated the Claus tail gas. The method may include feeding a third portion of the second byproduct stream to a thermal oxidizer.

In implementations, a first-stage adsorption unit includes the adsorbing first-stage adsorption vessel and the regenerating first-stage adsorption vessel, wherein the adsorbing first-stage adsorption vessel is a first-stage adsorption vessel operationally in an adsorption cycle, and wherein the regenerating first-stage adsorption vessel is a first-stage adsorption vessel operationally in a regeneration cycle. The first-stage adsorption unit may include a first-stage adsorption vessel operationally in standby. In implementations, the hydrogenated gas does not generally include sulfur-containing compounds other than hydrogen sulfide. In implementations, the first outlet gas does not generally include water. In implementations, the second byproduct stream does not generally include hydrogen sulfide. The first adsorbent and the second adsorbent may each be a molecular sieve. The first adsorbent may be, for example, molecular sieve 3A. The second adsorbent may be, for example, molecular sieve 4A.

Another embodiment is a system for treating Claus tail gas, including a hydrogenation reactor to receive the Claus tail gas and hydrogenate sulfur-containing compounds in the Claus tail gas into hydrogen sulfide to produce hydrogenated gas including hydrogen sulfide, water, and at least one of carbon dioxide or water. The system includes a quench tower to receive the hydrogenated gas and condense water in the hydrogenated gas to produce quenched gas comprising hydrogen sulfide, water, and at least of one of carbon dioxide or nitrogen, wherein condensed water is recovered as water condensate from the quench tower. The system includes a first first-stage adsorption vessel to receive in an adsorption cycle the quenched gas and adsorb water from the quenched gas onto first adsorbent (e.g., molecular sieve) to produce a first outlet gas including hydrogen sulfide and at least one of carbon dioxide or nitrogen. The system includes a first second-stage adsorption vessel to receive in an adsorption cycle the first outlet gas and adsorb hydrogen sulfide from the first outlet gas onto second adsorbent (e.g., molecular sieve) to produce a second byproduct stream including at least one of carbon dioxide or nitrogen. The system includes a second first-stage adsorption vessel to receive in a regeneration cycle a first portion of the second byproduct stream as regeneration gas and heat first adsorbent in second first-stage adsorption vessel per a temperature ramp to selectively desorb components from the first adsorbent in the second first-stage adsorption vessel to produce a first byproduct stream including desorbed components and at least one of carbon dioxide or nitrogen, wherein the components desorbed during a first part of the temperature ramp include primarily hydrogen sulfide. The second first-stage adsorption vessel may be configured to discharge the first byproduct stream to a reaction furnace of a Claus unit during the first part of the temperature ramp, wherein the first part of the temperature ramp is an initial part of the temperature ramp. The second first-stage adsorption vessel may be configured to discharge the first byproduct stream to the quench tower during a second part of the temperature ramp. In implementations, during the second part of the temperature ramp, the components desorbed from the first adsorbent comprise water or concentration of hydrogen sulfide in the first byproduct stream is less than a threshold value, or both, wherein the second part of the temperature ramp is later in time and at greater temperatures than the first part of the temperature ramp.

The system may include a second second-stage adsorption vessel to receive in a regeneration cycle a second portion of the second byproduct stream and desorb hydrogen sulfide from second adsorbent in the second second-stage adsorption vessel into the second portion of the second byproduct stream to produce a second outlet gas including hydrogen sulfide. The second second-stage adsorption vessel may discharge the second outlet gas to a Claus unit for feed to a reaction furnace of the Claus unit. The system may include a thermal oxidizer to receive a third portion of the second byproduct stream.

As used herein, the word "about" includes +/−5% of the cited magnitude. The word "substantially" includes +/−5% of the cited magnitude. The phrase "significant portion" refers to a portion that is more than 50% of the cited magnitude. The words "majority" and "primarily" can also refer to more than 50%.

EXAMPLES

Example 1 and Example 2 are presented. The Examples are given only as examples and not meant to limit the present techniques.

Example 1

Example 1 is directed to adsorption and desorption cycles for both water and hydrogen sulfide in molecular sieve 3A. Adsorption and desorption sequences were performed on molecular sieve 3A, using for the adsorption step, a gas mixture mimicking the tail gas of a Claus unit (fed by a high $CO_2/H_2S$ ratio acid gas) downstream the hydrogenation reactor and a quench tower. The gas mixture had the following composition by volume: 47.32% $N_2$, 44.75% $CO_2$, 6.1% $H_2$, 0.46% water ($H_2O$), 0.61% $H_2S$, 0.2% carbon monoxide (CO) and 0.56% Argon. Desorption was performed with a dry $CO_2/N_2$ (volume ratio 1:1) stream mimicking a slip stream of the tail gas downstream the adsorbent. Desorption temperature was set at 300° C.

Figure 6:
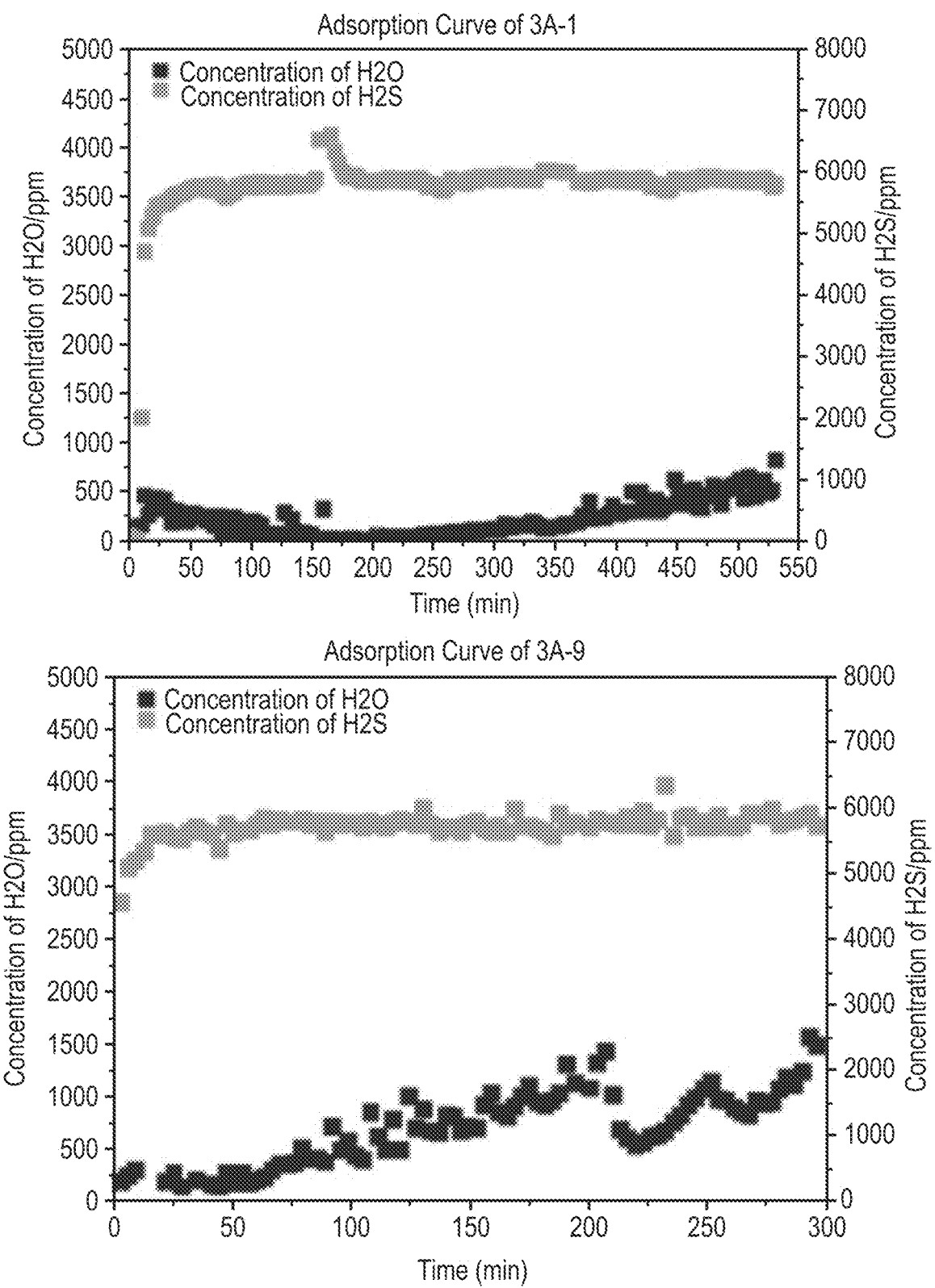
FIG. 6 is plots of adsorption curves for Example 1.
Figure 7:
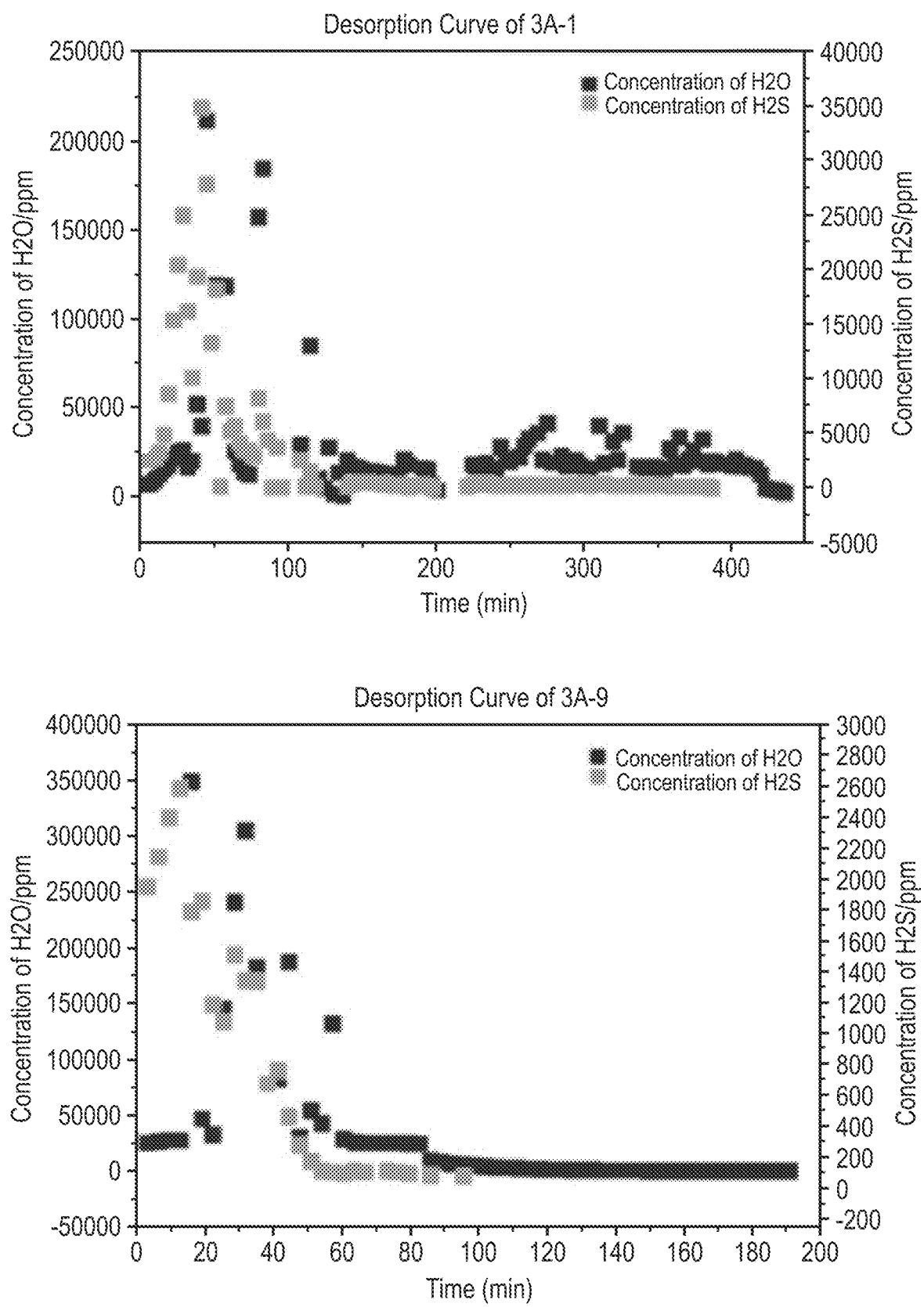
FIG. 7 is plots of desorption curves for Example 1.

FIGS. 6 and 7 depict tail-gas lean stream adsorption/desorption 1st and 9th cycles on the molecular sieve 3A. In particular, the adsorption breakthrough curves for the 1st cycle and 9th cycle are presented in FIG. 6. Desorption breakthrough curves for the 1st cycle and 9th cycle are presented in FIG. 7. A clear separation of the water and $H_2S$ peaks can be observed. In this case for commercial implementation, a hydrogen-sulfide rich gas stream may be directed to a Claus reaction furnace.

FIG. 6 gives plots of adsorption curves for the 1st cycle (3A-1) and 9th cycle (3A-9). The breakthrough concentration of water (ppm) not adsorbed over time (minutes) in the discharged gas is plotted as black squares. The breakthrough concentration of hydrogen sulfide (ppm) not adsorbed over time (minutes) in the discharged gas is plotted as dark gray squares.

FIG. 7 gives plots of desorption curves for the 1st cycle (3A-1) and 9th cycle (3A-9). The breakthrough concentration of desorbed water (ppm) over time (minutes) in the discharged gas is plotted as black squares. The breakthrough concentration of desorbed hydrogen sulfide (ppm) over time (minutes) in the discharged gas is plotted as dark gray squares.

Example 2

Example 2 is directed to adsorption and desorption cycles for both water and hydrogen sulfide in molecular sieve 4A. Adsorption and desorption sequences were performed on molecular sieve 4A, using for the adsorption step, a gas mixture mimicking the tail gas of a Claus unit (fed by a high $CO_2/H_2S$ ratio acid gas) downstream the hydrogenation reactor and a quench tower. The gas mixture had the following composition by volume: 47.32% $N_2$, 44.75% $CO_2$, 6.1% $H_2$, 0.46% $H_2O$, 0.61% $H_2S$, 0.2% CO and 0.56% Argon.

Figure 8:
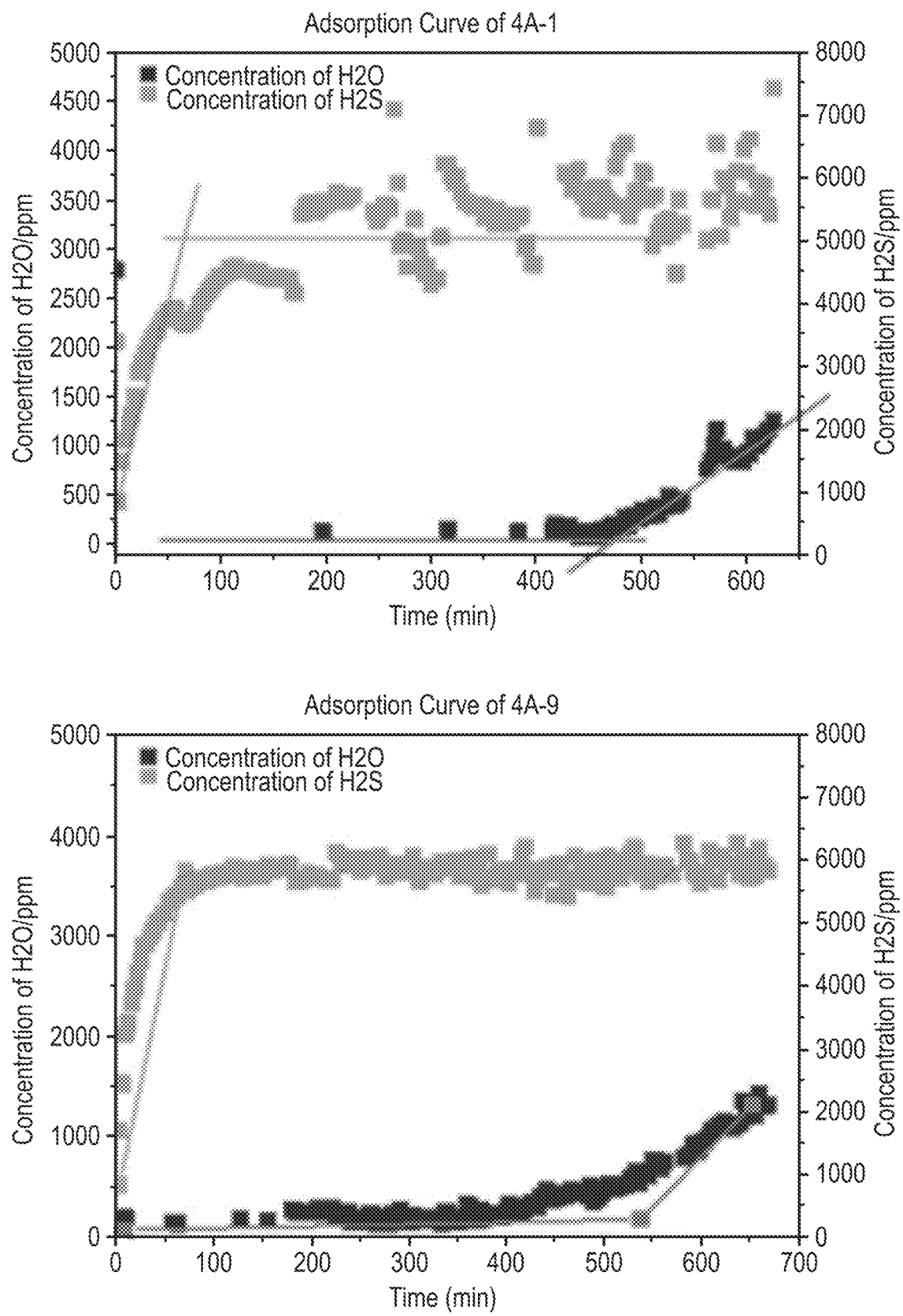
FIG. 8 is plots of adsorption curves for Example 2.
Figure 9:
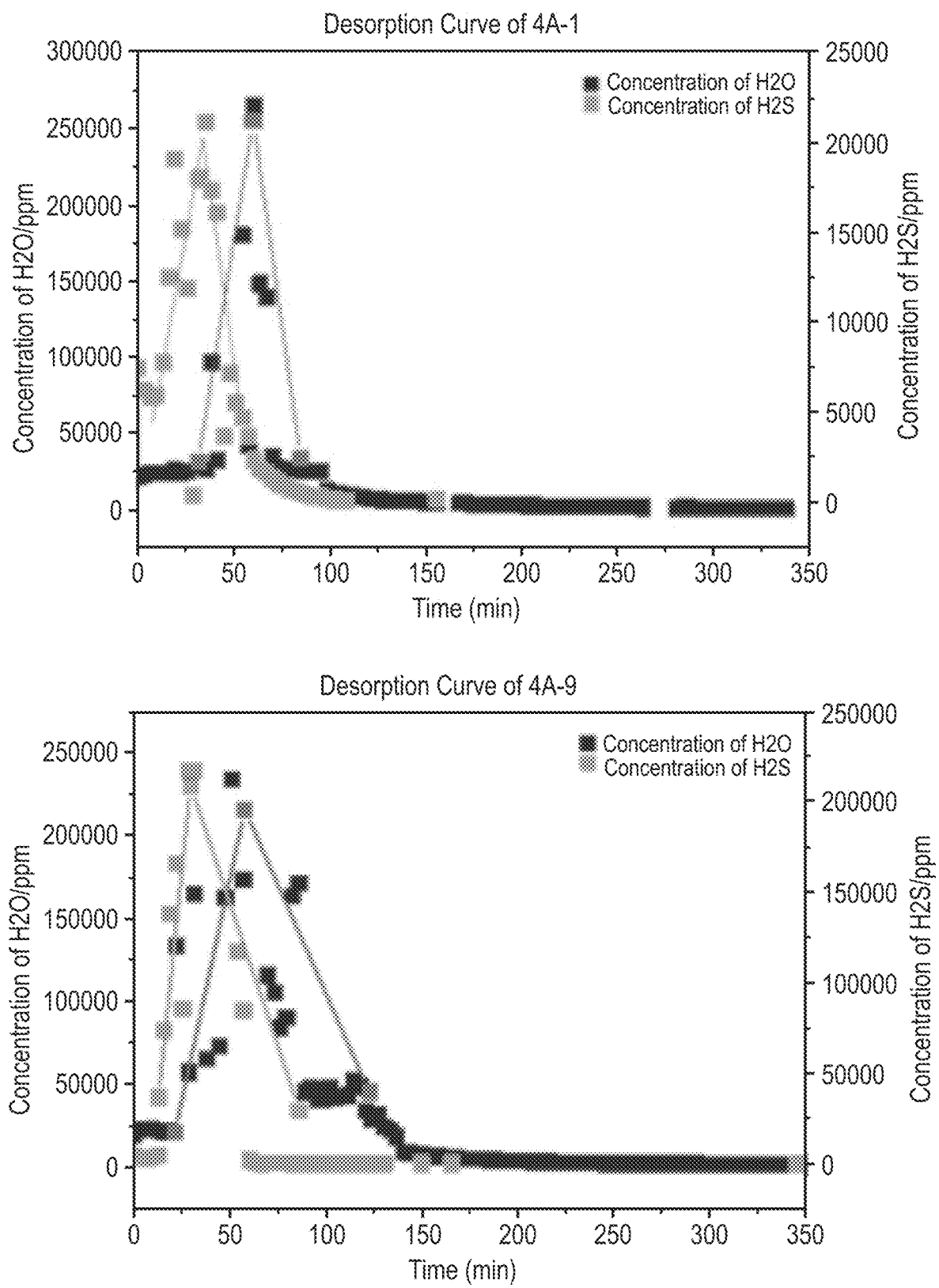
FIG. 9 is plots of desorption curves for Example 2.

FIGS. 8 and 9 depict tail-gas lean stream adsorption/desorption 1st and 9th cycles on molecular sieve 4A. In particular, the adsorption breakthrough curves for the 1st cycle and 9th cycle are presented in FIG. 8. Desorption breakthrough curves for the 1st cycle and 9th cycle are presented in FIG. 9. Desorption was performed with a dry $CO_2/N_2$ (volume ratio 1:1) stream mimicking a slip stream of the tail gas downstream the adsorbent. Desorption temperature was set at 300° C. A clear separation of the water and $H_2S$ peaks can be observed. In this case for commercial implementation, a hydrogen-sulfide rich gas stream may be directed to a Claus reaction furnace.

FIG. 8 gives plots of adsorption curves for the 1st cycle (4A-1) and 9th cycle (4A-9). The breakthrough concentration of water (ppm) not adsorbed over time (minutes) in the discharged gas is plotted as black squares. The breakthrough concentration of hydrogen sulfide (ppm) not adsorbed over time (minutes) in the discharged gas is plotted as dark gray squares.

FIG. 9 gives plots of desorption curves for the 1st cycle (4A-1) and 9th cycle (4A-9). The breakthrough concentration of desorbed water (ppm) over time (minutes) in the discharged gas is plotted as black squares. The breakthrough concentration of desorbed hydrogen sulfide (ppm) over time (minutes) in the discharged gas is plotted as dark gray squares.

Figure 10:
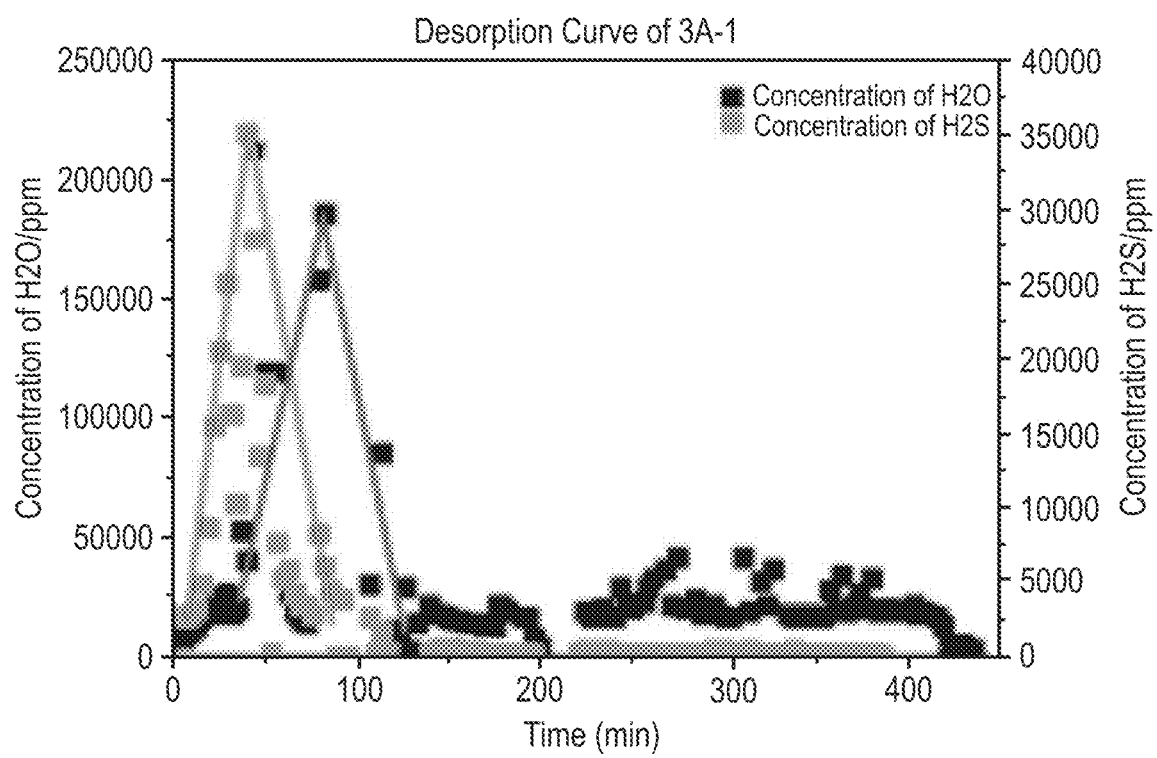
FIG. 10 is FIG. 7 with separation of peaks highlighted.

FIG. 10 is the plot of desorption curves for the 1st cycle the molecular sieve 3A from Example 1 in FIG. 7. In particular, FIG. 10 is FIG. 7 with separation of peaks highlighted. FIG. 10 is depicted highlighting a separation of peaks between concentration of desorbed hydrogen sulfide as breakthrough in the discharged gas and concentration of desorbed water as breakthrough in the discharged gas.

Figure 11:
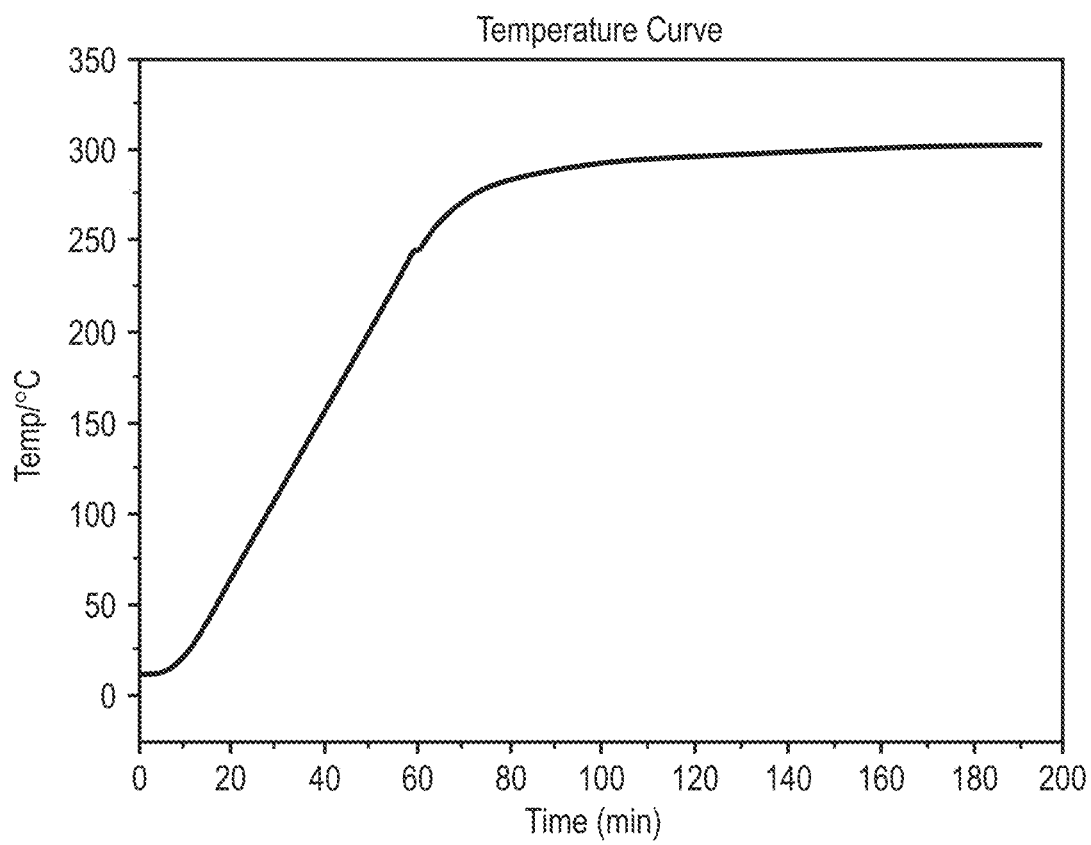
FIG. 11 is a plot of temperature of the adsorbent versus time for Examples 1 and 2.

FIG. 11 is a plot of temperature (° C.) of the adsorbent (molecular sieves 3A and 4A) versus time (minutes) for Examples 1 and 2. The plotted curve is a temperature curve (temperature ramp) of the adsorbent during desorption (regeneration) of the adsorbent.

A number of implementations have been described. Nevertheless, it will be understood that various modifications may be made without departing from the spirit and scope of the disclosure.

What is claimed is:

1. A method for sulfur recovery, comprising:
hydrogenating Claus tail gas to produce hydrogenated gas comprising hydrogen sulfide, water, and at least of one of carbon dioxide or nitrogen;
processing the hydrogenated gas in a quench tower to produce quenched gas comprising hydrogen sulfide, water, and at least one of carbon dioxide or nitrogen;
feeding the quenched gas to an adsorbing first-stage adsorption vessel;
adsorbing water from the quenched gas onto first adsorbent in the adsorbing first-stage adsorption vessel to produce a first outlet gas, the first outlet gas comprising hydrogen sulfide and at least one of carbon dioxide or nitrogen;
feeding the first outlet gas to an adsorbing second-stage adsorption vessel;
adsorbing hydrogen sulfide from the first outlet gas onto second adsorbent in the adsorbing second-stage adsorption vessel to produce a second byproduct stream comprising at least one of carbon dioxide or nitrogen;
feeding a first portion of the second byproduct stream as regeneration gas to a regenerating first-stage adsorption vessel; and
heating the regenerating first-stage adsorption vessel in a temperature ramp to selectively desorb components from first adsorbent in the regenerating first-stage adsorption vessel to produce a first byproduct stream comprising desorbed components, wherein the components desorbed during a first part of the temperature ramp comprise primarily hydrogen sulfide.

2. The method of claim 1, wherein the first byproduct stream further comprises at least one of carbon dioxide or nitrogen, and wherein the first adsorbent and the second adsorbent each comprise a molecular sieve.

3. The method of claim 1, comprising feeding the first byproduct stream to a reaction furnace of a Claus unit during the first part of the temperature ramp, wherein the first part of the temperature ramp comprises an initial part of the temperature ramp.

4. The method of claim 1, wherein during a second part of the temperature ramp, the components desorbed from the first adsorbent in the regenerating first-stage adsorption vessel comprise water or concentration of hydrogen sulfide in the first byproduct stream is less than a threshold value, or both, and wherein the second part of the temperature ramp is later in time and at greater temperatures than the first part of the temperature ramp.

5. The method of claim 1, comprising feeding the first byproduct stream to the quench tower during a second part of the temperature ramp.

6. The method of claim 1, wherein a first-stage adsorption unit comprises the adsorbing first-stage adsorption vessel and the regenerating first-stage adsorption vessel, wherein the adsorbing first-stage adsorption vessel is a first-stage adsorption vessel operationally in an adsorption cycle, wherein the regenerating first-stage adsorption vessel is a first-stage adsorption vessel operationally in a regeneration cycle, and wherein the first adsorbent comprises molecular sieve 3A.

7. The method of claim 6, wherein the first-stage adsorption unit comprises a first-stage adsorption vessel operationally in standby, and wherein the second adsorbent comprises molecular sieve 4A.

8. The method of claim 1, comprising feeding a second portion of the second byproduct stream to a regenerating second-stage adsorption vessel and desorbing hydrogen sulfide from second adsorbent in the regenerating second-stage adsorption vessel into the second portion of the second byproduct stream to produce a second outlet gas comprising hydrogen sulfide.

9. The method of claim 8, comprising providing the second outlet gas as feed gas for a reaction furnace of a Claus unit that generated the Claus tail gas.

10. The method of claim 1, wherein a significant portion of the water in the quenched gas is adsorbed onto the first adsorbent in the adsorbing first-stage adsorption vessel, wherein the first adsorbent in the adsorbing first-stage adsorption vessel adsorbs water while passes hydrogen sulfide, carbon dioxide, and nitrogen to form the first outlet gas during an adsorption cycle, and wherein the second adsorbent adsorbs hydrogen sulfide while passes carbon dioxide and nitrogen to form the second byproduct stream during an adsorption cycle.

11. The method of claim 1, comprising feeding a third portion of the second byproduct stream to a thermal oxidizer, wherein the hydrogenated gas does not comprise sulfur-containing compounds other than hydrogen sulfide, wherein the first outlet gas does not comprise water, and wherein the second byproduct stream does not comprise hydrogen sulfide.

12. The method of claim 1, wherein hydrogenating the Claus tail gas comprises converting sulfur-containing compounds in the Claus tail gas into hydrogen sulfide in a hydrogenation reactor to produce the hydrogenated gas comprising hydrogen sulfide, water, and at least one of carbon dioxide or nitrogen.

13. The method of claim 1, wherein hydrogenating the Claus tail gas comprises feeding the Claus tail gas comprising sulfur-containing compounds to a hydrogenation reactor and converting the sulfur-containing compounds in the hydrogenation reactor to hydrogen sulfide to produce the hydrogenated gas comprising hydrogen sulfide, water, and at least one of carbon dioxide or nitrogen.

14. The method of claim 1, wherein processing the hydrogenated gas in a quench tower comprises feeding the hydrogenated gas to the quench tower, condensing water in the hydrogenated gas in the quench tower, and removing water condensate from the quench tower to produce the quenched gas, and wherein the quenched gas comprises the hydrogenated gas without the water condensate removed.

15. A system for treating Claus tail gas, comprising:
a hydrogenation reactor to receive the Claus tail gas and hydrogenate sulfur-containing compounds in the Claus tail gas into hydrogen sulfide to produce hydrogenated gas comprising hydrogen sulfide, water, and at least one of carbon dioxide or water;
a quench tower to receive the hydrogenated gas and condense water in the hydrogenated gas to produce quenched gas comprising hydrogen sulfide, water, and at least of one carbon dioxide or nitrogen, wherein condensed water is recovered as water condensate from the quench tower;
a first first-stage adsorption vessel to receive in an adsorption cycle the quenched gas and adsorb water from the quenched gas onto first adsorbent to produce a first outlet gas comprising hydrogen sulfide and at least one of carbon dioxide or nitrogen;
a first second-stage adsorption vessel to receive in an adsorption cycle the first outlet gas and adsorb hydrogen sulfide from the first outlet gas onto second adsorbent to produce a second byproduct stream comprising at least one of carbon dioxide or nitrogen; and
a second first-stage adsorption vessel to receive in a regeneration cycle a first portion of the second byproduct stream as regeneration gas and heat first adsorbent in second first-stage adsorption vessel per a temperature ramp to selectively desorb components from the first adsorbent in the second first-stage adsorption vessel to produce a first byproduct stream comprising desorbed components and at least one of carbon dioxide or nitrogen, wherein the components desorbed during a first part of the temperature ramp comprise primarily hydrogen sulfide.

16. The system of claim 15, wherein the second first-stage adsorption vessel to discharge the first byproduct stream to a reaction furnace of a Claus unit during the first part of the temperature ramp, and wherein the first part of the temperature ramp comprises an initial part of the temperature ramp.

17. The system of claim 15, wherein the second first-stage adsorption vessel to discharge the first byproduct stream to the quench tower during a second part of the temperature ramp.

18. The system of claim 17, wherein during the second part of the temperature ramp, the components desorbed from the first adsorbent comprise water or concentration of hydrogen sulfide in the first byproduct stream is less than a threshold value, or both, and wherein the second part of the temperature ramp is later in time and at greater temperatures than the first part of the temperature ramp.

19. The system of claim 15, comprising a second second-stage adsorption vessel to receive in a regeneration cycle a second portion of the second byproduct stream and desorb hydrogen sulfide from second adsorbent in the second second-stage adsorption vessel into the second portion of the second byproduct stream to produce a second outlet gas comprising hydrogen sulfide.

20. The system of claim 19, wherein the second second-stage adsorption vessel to discharge the second outlet gas to a Claus unit for feed to a reaction furnace of the Claus unit.

21. The system of claim 15, comprising a thermal oxidizer to receive a third portion of the second byproduct stream.

22. The system of claim 15, wherein the first adsorbent and the second adsorbent each comprise a molecular sieve.

* * * * *